(12) United States Patent
Yang et al.

(10) Patent No.: US 11,109,202 B2
(45) Date of Patent: Aug. 31, 2021

(54) METHOD AND SYSTEM FOR INTELLIGENT ROUTING FOR MOBILE EDGE COMPUTING

(71) Applicant: Verizon Patent and Licensing Inc., Arlington, VA (US)

(72) Inventors: Jin Yang, Orinda, CA (US); Sagiv Draznin, Walnut Creek, CA (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 85 days.

(21) Appl. No.: 16/202,702

(22) Filed: Nov. 28, 2018

(65) Prior Publication Data

US 2020/0169857 A1 May 28, 2020

(51) Int. Cl.
*H04W 4/50* (2018.01)
*H04L 12/26* (2006.01)
*H04L 12/24* (2006.01)

(52) U.S. Cl.
CPC ........... *H04W 4/50* (2018.02); *H04L 41/5009* (2013.01); *H04L 43/0858* (2013.01)

(58) Field of Classification Search
CPC ................. H04W 4/50; H04L 41/5009; H04L 43/0858
See application file for complete search history.

(56) References Cited

U.S. PATENT DOCUMENTS

| | | | |
|---|---|---|---|
| 2014/0094159 A1* | 4/2014 | Raleigh ................. | H04W 24/02 455/418 |
| 2016/0234825 A1* | 8/2016 | Axmon .................... | H04W 8/00 |
| 2018/0270119 A1* | 9/2018 | Ballapuram ........ | H04L 61/2015 |
| 2020/0137182 A1* | 4/2020 | Zong ....................... | H04L 67/16 |

* cited by examiner

*Primary Examiner* — John A Follansbee
*Assistant Examiner* — Fadi Haj Said

(57) ABSTRACT

A method, a device, and a non-transitory storage medium are described in which a mobile edge network-based intelligent routing service is provided. The intelligent routing service includes using default network devices to initially provide application services to end devices. The intelligent routing service further includes selecting and migrating the application services to a multi-layered mobile edge computing network when performance metrics associated with the application services are not satisfied. The intelligent routing service may determine whether performance metrics are satisfied based on performance metric information obtained from the serving nodes and the end devices.

20 Claims, 17 Drawing Sheets

| | INTELLIGENT MEC-BASED ROUTING INFORMATION | | | | | |
|---|---|---|---|---|---|---|
| | TEMPORARY NETWORK ADDRESS | GLOBAL NETWORK ADDRESS | ANCHOR NODE | TTL | RETRY | PERFORMANCE METRIC |
| 301-1 → | 10.10.10.10 | 1.1.1.1 | PGW/UPF 1 | 100 | 3 | LATENCY/25 ms |
| | | | | | | |
| | | | | | | |
| 301-X → | ••• | ••• | ••• | ••• | ••• | ••• |
| | ↑ 305 | ↑ 310 | ↑ 315 | ↑ 320 | ↑ 325 | ↑ 330 |

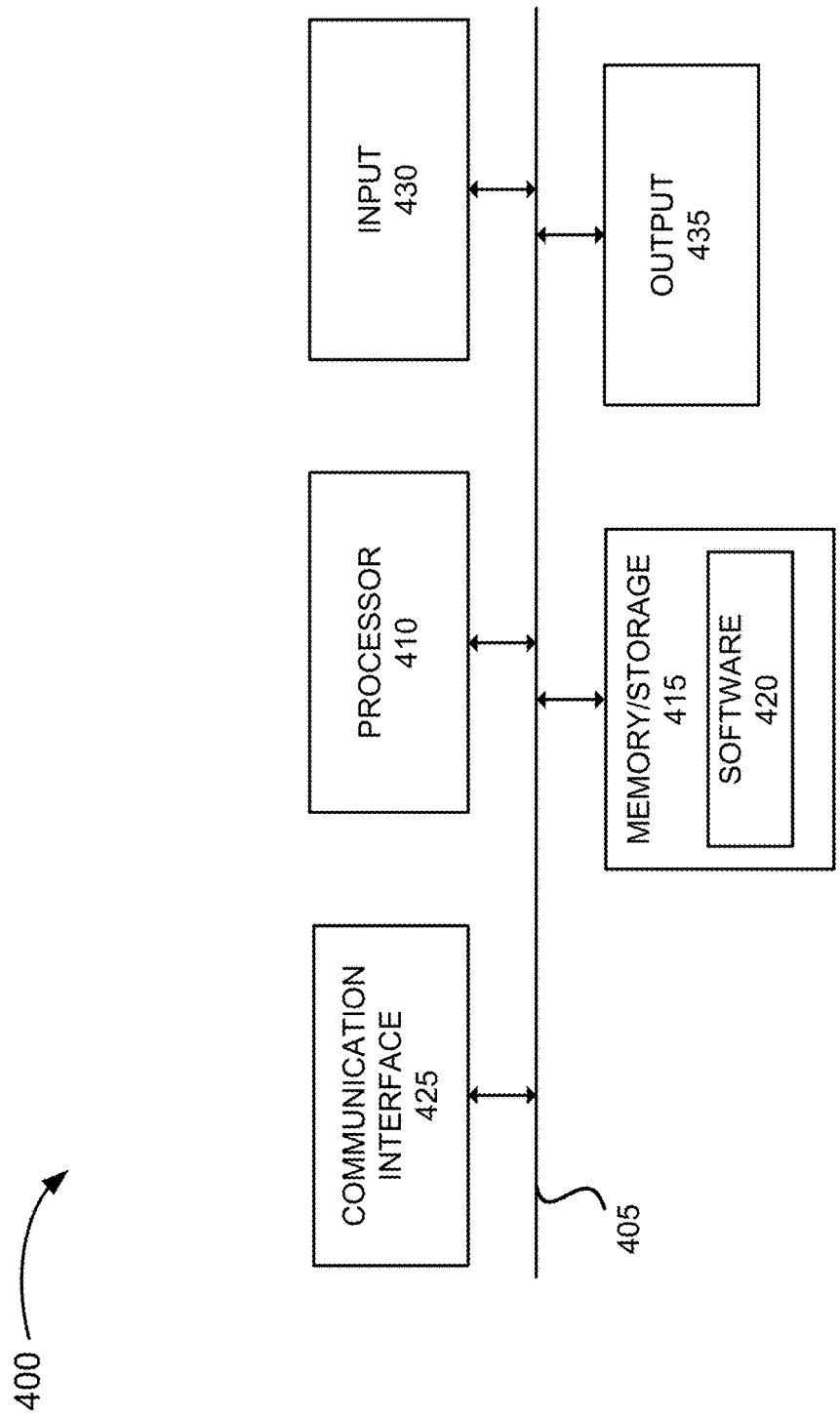

METHOD AND SYSTEM FOR INTELLIGENT ROUTING FOR MOBILE EDGE COMPUTING

BACKGROUND

Multi-access Edge Computing (MEC) (also known as mobile edge computing) is being explored in which core network capabilities (e.g., computational, storage, etc.) are situated at the network edge to improve latency and reduce traffic being sent to a core network. Additionally, other technologies, such as cloud computing, software defined networking (SDN), etc., are also being explored to provision services and applications to various end devices and end users.

BRIEF DESCRIPTION OF THE DRAWINGS

FIG. 3 is a diagram of exemplary intelligent MEC-based routing information;

FIG. 4 is a diagram illustrating exemplary components of a device that may correspond to one or more of the devices illustrated and described herein;

DETAILED DESCRIPTION OF PREFERRED EMBODIMENTS

Figure 1A:
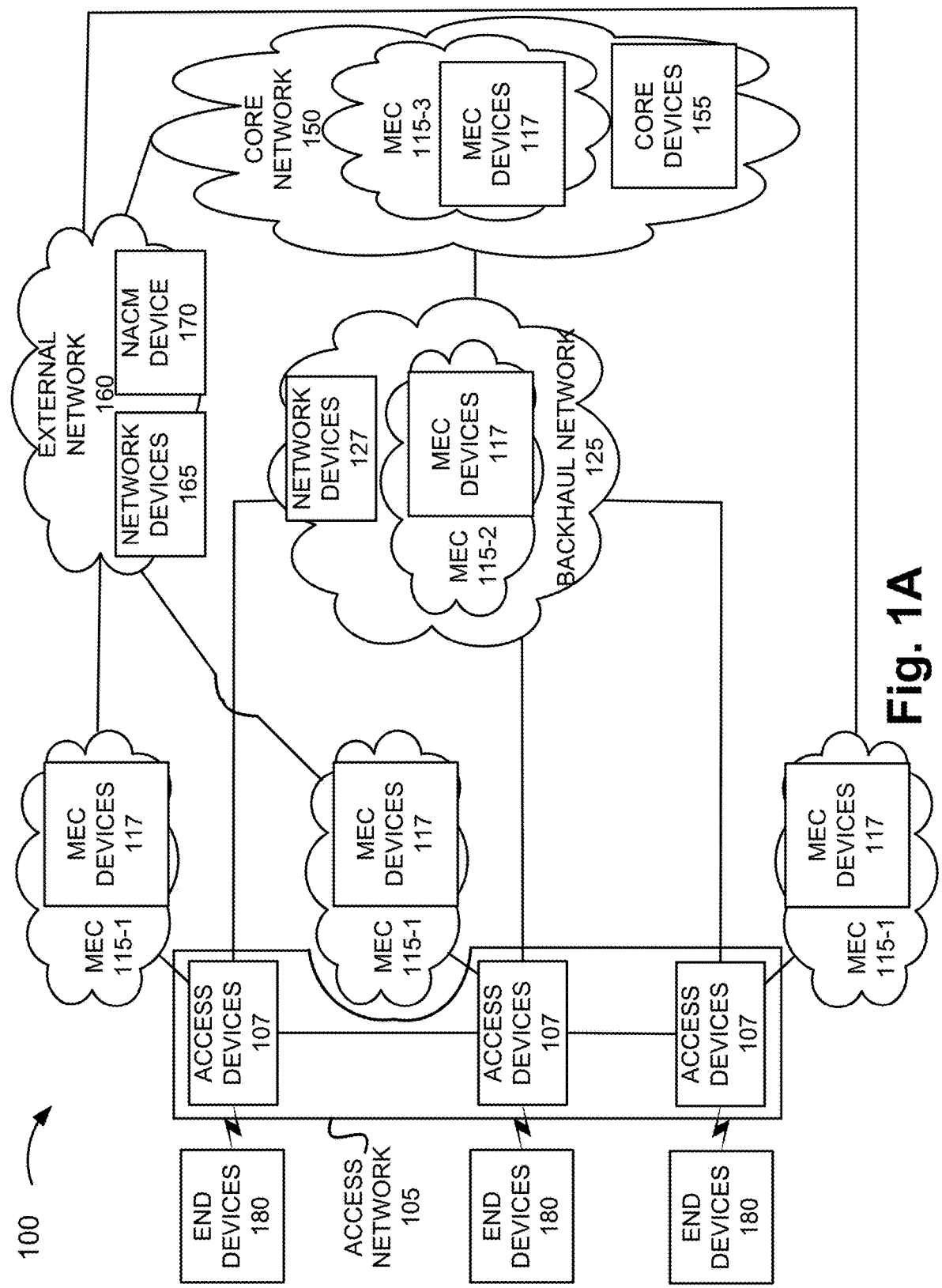
FIG. 1A is a diagram illustrating an exemplary environment in which an exemplary embodiment of a mobile edge network-based intelligent routing service may be implemented.

The following detailed description refers to the accompanying drawings. The same reference numbers in different drawings may identify the same or similar elements. Also, the following detailed description does not limit the invention.

A network should support various use cases, meet various performance metrics, allow for scalability and flexibility, and so forth. MEC servers may provide various services and applications to end devices with minimal latency because of their close proximity to the network edge. However, the network resources of MEC servers are typically expensive due to their limited available resources (e.g., physical, logical, virtual). Depending on the types of applications and services requested from the end devices, MEC servers may or may not be used, or there may be MEC networks residing in different parts of a network (e.g., co-located with an access network, co-located with a core network, co-located with a backhaul/fronthaul network, etc.) that are configurable to provide different services and applications, and support different performance metrics. In this regard, there are technological problems associated with satisfying performance metric requirements associated with services and applications as well as efficiently managing the allocation and utilization of network resources responsive to the demands of the end devices.

According to exemplary embodiments, a mobile edge network-based intelligent routing service is described. According to an exemplary embodiment, end devices will initially anchor to a default network device that includes logic that provides the mobile edge network-based intelligent routing service. The default network device includes logic that manages the selection and use of network devices used to provide an application and/or a service (also referred to as "application service") to end devices. According to an exemplary embodiment, the management of the selection and use of network devices include anchor nodes and server nodes, as described herein. According to an exemplary embodiment, the network devices are included in different MEC layers of a MEC network, as described herein.

According to an exemplary embodiment, the mobile edge network-based intelligent routing service may be configured such that the default network device and a default server provide the application service to end devices when various criteria are met. For example, the criteria may include whether or not a performance metric associated with the application service and/or the type of application service (e.g., a category of application service) is satisfied, and/or whether or not a performance metric associated with subscription information pertaining to the end device is satisfied. Additionally, for example, the criteria may include factors relating to the type of end device (e.g., mobile versus stationary), the mobility (or lack thereof) of the end device during the application service session, and the location of the end device and its relationship to the network topology of network devices in the network environment, as described herein. According to an exemplary embodiment, the criteria may include configurable network policies and/or rules that include threshold parameters and values.

According to an exemplary embodiment, a MEC network of the multi-MEC layers may provide the default network device with information indicating the application services that the MEC network supports. According to an exemplary implementation, the MEC network may announce (e.g., broadcast, unicast) to the default network device the application services that the MEC network can support. This may be performed periodically and/or in response to a triggering event. For example, the triggering event may be the addition or deletion of an application service to/from the MEC network. The default network device may use this information when selecting a candidate MEC network to provide the application service, as described herein. According to another exemplary implementation, the default network device may query the MEC network for this information during a migration procedure, as described herein.

According to an exemplary embodiment, the default network device may be configured to select and use one of the anchor nodes and server nodes of the MEC layers to provide the application service to the end device when criteria are not satisfied. According to an exemplary embodiment, the default network device may obtain performance metric information from the end device and from an assigned default server during an application service session. The default network device may determine whether the criteria are satisfied based on the performance metric information, as described herein. In this way, the default network device may intelligently select and manage the provisioning of the application service based on information from the network-side and the end device-side perspectives.

According to an exemplary embodiment, the default network device may manage the preparation, migration, and provisioning of the application service from the default network device and default server to an anchor node and a server of a MEC layer when the criteria are not satisfied. According to an exemplary embodiment, subsequent to the provisioning of the application service to a MEC layer, the MEC layer and the end device may provide performance metric information to the default network device. According to an exemplary embodiment, when the criteria are not being satisfied by the anchor node and the server of the MEC layer, the default network device may select another anchor node or another server of the same or of a different MEC layer to provide the application service, or re-capture the provisioning of the application service by the default network device and the default server. According to an exemplary embodiment, the default network device may mange the preparation, migration, and provisioning of the application service pertaining to these transitions.

According to an exemplary embodiment, the default network device includes logic that stores and manages intelligent MEC-based routing information. For example, the intelligent MEC-based routing information may include context information pertaining to anchor nodes, network addresses assigned to end devices by the default network device, performance metric information, and other types of information, as described herein. According to an exemplary embodiment, the mobile edge network-based intelligent routing service includes the assignment of Internet Protocol (IP) addresses to the end devices. According to an exemplary implementation, the IP addresses include a global or permanent IP address and one or multiple temporary IP address, as described herein.

As a result, the mobile edge network-based intelligent routing service may improve resource utilization in a network and at the end device. For example, the intelligent routing service may select and cause to be provisioned an application service in a MEC layer of a multi-layer MEC network when certain criteria may not be satisfied by the default network device and default server. In this regard, use of costly network resources of a MEC network may be more optimally utilized for the provisioning of an application service to the end device, while concurrently satisfying performance metrics from the network and end device perspectives. Additionally, use of end device resources may not be unnecessarily utilized to migrate to different MEC networks when the default network device and default server provides the application service in a manner that satisfies the performance metrics. For example, when an end device moves out of the coverage area of an original MEC serving node, various performance metrics (e.g., latency, etc.) may need to be maintained. According to some approaches, the session and original network address (e.g., Internet Protocol (IP) address) assigned to the end device may be maintained or the session is torn down and a new session and a new network address assignment are established relative to another MEC serving node.

FIG. 1A is a diagram illustrating an exemplary environment 100 in which an exemplary embodiment of the mobile edge network-based intelligent routing service may be implemented. As illustrated, environment 100 includes an access network 105, MEC networks 115-1 through 115-3 (also referred to collectively as MEC networks 115, or individually or generally as MEC network 115), a backhaul network 125, a core network 150, and an external network 160. Access network 105 includes access devices 107, MEC networks 115 include MEC devices 117, backhaul network 125 includes network devices 127, core network 150 includes core devices 155, and external network 160 includes network devices 165 and a network address and content management (NACM) device 170. Environment 100 further includes end devices 180 (also referred to individually or generally as end device 180).

The number, the type, and the arrangement of network devices in environment 100, as illustrated and described, are exemplary. The number of end devices 180 is also exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

The number, the type, and the arrangement of networks in environment 100, as illustrated and described, are exemplary. According to an exemplary embodiment, as described herein, environment 100 includes multi-layered MEC networks (e.g., MEC networks 115). According to an exemplary implementation, the multi-layered MEC network includes MEC networks 115 deployed at different proximities to the network edge. For example, in a tertiary-layered MEC network framework, one layer of the multi-layered MEC network may be implemented at the network's edge (e.g., in the access wireless network 105 or proximate to access devices 107 (e.g., evolved Node Bs (eNBs), next generation Node Bs (gNBs), femtocell devices, an evolved Long Term Evolution (LTE) (eLTE) eNB, etc.)), another MEC layer may be implemented in an intermediary network (e.g., in backhaul network 125 or proximate thereto), and yet another MEC layer may be implemented in core network 150 (e.g., co-located in core network 150 or proximate thereto). According to other exemplary implementations, the number of MEC layers of the multi-layered MEC network may be different (e.g., fewer or additional). Additionally, or alternatively, according to other exemplary implementations, the proximity to the network edge and/or location within a network for a MEC layer may be different. The multi-layered MEC networks may be based on, for example, different latencies between MEC layers, different routing between MEC layers, and/or different networks (e.g., access, backhaul, core, etc.) to which MEC layers may be co-located or proximate thereto.

Environment 100 includes communication links between the network devices, and between end device 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1A. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the mobile edge network-based intelligent routing service may use at least one of these planes of communication. Additionally, an interface of a network device (e.g., an interface defined by a standards body, such as Third Generation Partnership Project (3GPP), International Telecommunication Union (ITU), European Telecommunications Standards Institute (ETSI), etc.) may be modified in order to support the communication (e.g., transmission and reception of messages, information elements (IE), attribute value pairs (AVPs), etc.) between network devices and the mobile edge network-based intelligent routing service, as described herein. According to various exemplary implementations, the interface may be a service-based interface or a reference point-based interface.

Access network 105 may include one or multiple networks of one or multiple types and technologies. For example, access network 105 may include a Fourth Generation (4G) RAN, a 4.5G RAN, a 5G RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, and a next generation (NG) RAN. Access network 105 may further include other types of wireless networks, such as a WiFi network, a Worldwide Interoperability for Microwave Access (WiMAX) network, a local area network (LAN), or another type of network that may provide an on-ramp to another network.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technology (RAT), etc.), wireless standards, wireless frequencies/bands, and so forth.

Access network 105 may include different and multiple functional splitting, such as options 1, 2, 3, 4, 5, 6, 7, or 8, plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

Depending on the implementation, access network 105 may include one or multiple types of access devices 107. For example, access devices 107 may be implemented to include an eNB, a gNB, an eLTE eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node (e.g., a WiFi device, a WiMax device, a hot spot device, etc.) that provides a wireless access service.

MEC networks 115 include multiple networks of one or multiple network types and technologies. MEC networks 115 provide access and use of services and applications by end devices 180. According to an exemplary embodiment, MEC networks 115 include a multi-layered framework in which MEC networks are deployed at different proximities to the network edge (e.g., relative to end devices 180). For example, MEC network 115-1 may be considered one layer, MEC network 115-2 may be considered another layer, and MEC network 115-3 may be considered yet another layer of the multi-layered MEC framework. According to an exemplary implementation, MEC network 115-1 may be co-located to access devices 107 of a particular geographic region within access network 105, MEC network 115-2 may be co-located to network devices 127 of backhaul network 125, and MEC network 115-3 may be co-located to core devices 155 of core network 150. In view of this architecture, MEC networks 115-1 may have a lower latency than MEC network 115-2 and MEC network 115-3, as well as network devices 165. Additionally, MEC network 115-2 may have a lower latency than MEC network 115-3 and network devices 165. MEC network 115-3 may have a lower latency than network devices 165.

MEC network 115 may be implemented using one or multiple technologies including, for example, SDN, network function virtualization (NFV), cloud computing, Infrastructure-as-a-Service (IaaS), Platform-as-a-Service (PaaS), Software-as-a-Service (SaaS), or another type of network technology. Depending on the implementation, MEC network 115 may include, for example, virtualized network functions (VNFs), multi-access (MA) applications/services, and/or servers that provide application services for use by end devices 180. MEC network 115 may also include other types of network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices, network resources (e.g., storage devices, communication links, etc.). MEC network 115 may further include network devices that provide core network functionalities (e.g., functions associated with core devices 155, as described herein). For purposes of illustration and description, MEC devices 117 may include the various types of network devices that may be resident in MEC network 115, as described herein.

Figure 1B:
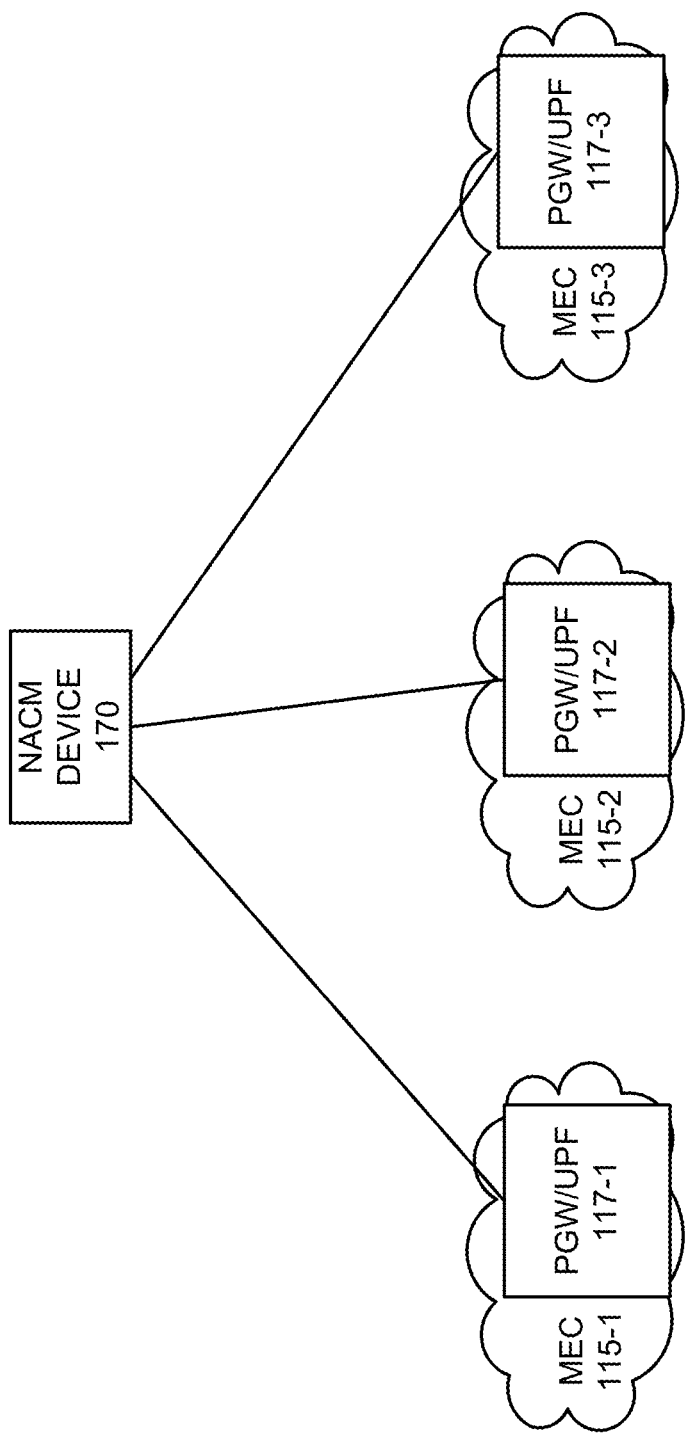
FIG. 1B is a diagram illustrating an exemplary implementation of a configuration for a mobile edge network-based intelligent routing service.

According to an exemplary embodiment, MEC devices 117 may provide a mobile edge network-based intelligent routing service. For example, referring to FIG. 1B, a packet data network gateway (PGW)/user plane function (UPF) 117-1 of MEC network 115-1, a PGW/UPF 117-2 of MEC network 115-2, and a PGW/UPF 117-3 of MEC network 115-3 may each be communicatively coupled (e.g., directly or indirectly) to NACM device 170. According to other exemplary embodiments, additional and/or different types of network devices that have core network functionality may be implemented (e.g., serving gateway (SGW), mobility management entity (MME), an access and mobility management function (AMF), a session management function (SMF), etc.).

Backhaul network 125 may include one or multiple networks of one or multiple types and technologies. According to an exemplary implementation, backhaul network 125 includes a backbone network. For example, the backbone network may be implemented as an optical transport network, an ultra-high capacity wireless backhaul network, an Ethernet backhaul network, a dark fiber network, or another suitable architecture (e.g., Internet Protocol (IP)/Multiprotocol Label Switching (MPLS), millimeter wave technology, etc.). Depending on the implementation, backhaul network 125 may include switches, routers, repeaters, various types of optical network elements (e.g., multiplexers, de-multiplexers, switches, transmitters, receivers, etc.), and/or other types of network devices. For purposes of illustration and description, network devices 127 may include the various types of network devices that may be resident in backhaul network 125, as described herein. Backhaul network 125 includes a fronthaul network.

Core network 150 may include one or multiple networks of one or multiple network types and technologies. Core network 150 may include a complementary network of access network 105. For example, core network 150 may be implemented to include an Evolved Packet Core (EPC) of an LTE, an LTE-A network, an LTE-A Pro network, a next generation core (NGC) network, and/or a legacy core network. Depending on the implementation of core network 150, core network 150 may include various network devices, such as for example, an MME, a PGW, a SGW, a home subscriber server (HSS), an authentication, authorization, and accounting (AAA) server, a policy and charging rules function (PCRF), a charging system (CS), a UPF, an AMF, a SMF, a unified data management (UDM) device, an authentication server function (AUSF), a network slice selection function (NSSF), a network repository function (NRF), a policy control function (PCF), and so forth. According to other exemplary implementations, core network 150 may include additional, different, and/or fewer network devices than those described. For purposes of illustration and description, network devices 155 may include various types of network devices that may be resident in core network 150, as described herein.

External network 160 may include one or multiple networks of one or multiple types and technologies. For example, external network 160 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, or other type of network that hosts an end device application or service. For example, the end device application/service network may provide various applications or services pertaining to broadband access in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation, external network 160 may include various network devices that provide various applications, services, or other type of end device assets, such as servers (e.g., web, application, cloud, etc.), mass storage devices, data center devices, and/or other types of network devices pertaining to various network-related functions. For purposes of illustration and description, network devices 165 may include various types of network devices that may be resident in external network 160, as described herein. According to an exemplary embodiment, network devices 165 may include a set of default servers that provide application services, as described herein.

NACM device 170 includes a network device that provides the mobile edge network-based intelligent routing service, as described herein. According to an exemplary embodiment, as illustrated, NACM device 170 may be implemented as a network device included in external network 160. According to other exemplary embodiments, NACM device 170 may reside in a network different from external network 160 (e.g., in core network 150, etc). According to an exemplary embodiment, NACM device 170 may include logic that provides a default anchor node service. For example, NACM device 170 may include a packet data network gateway PGW function, a user plane function (UPF), or a combination of both. NACM device 170 is described further below.

End device 180 may be implemented as a mobile device, a portable device, a stationary device, a device operated by a user, or a device not operated by a user. For example, end device 180 may be implemented as a Mobile Broadband device, a smartphone, a computer, a tablet, a netbook, a phablet, a wearable device, a vehicle support system, a game system, a drone, an Internet of Things (IoT) device, an enhanced MTC device (eMTC) (also known as Cat-M1), a NarrowBand IoT (NB-IoT) device, or some other type of wireless device (e.g., a set top box, a smart television, a music playing device, etc.). According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, network slicing, DC service, and so forth. Additionally, end device 180 may include one or multiple communication interfaces that provide one or multiple (e.g., simultaneous or non-simultaneous) connections via the same or different RATs, frequency bands, etc.

Figure 2A:
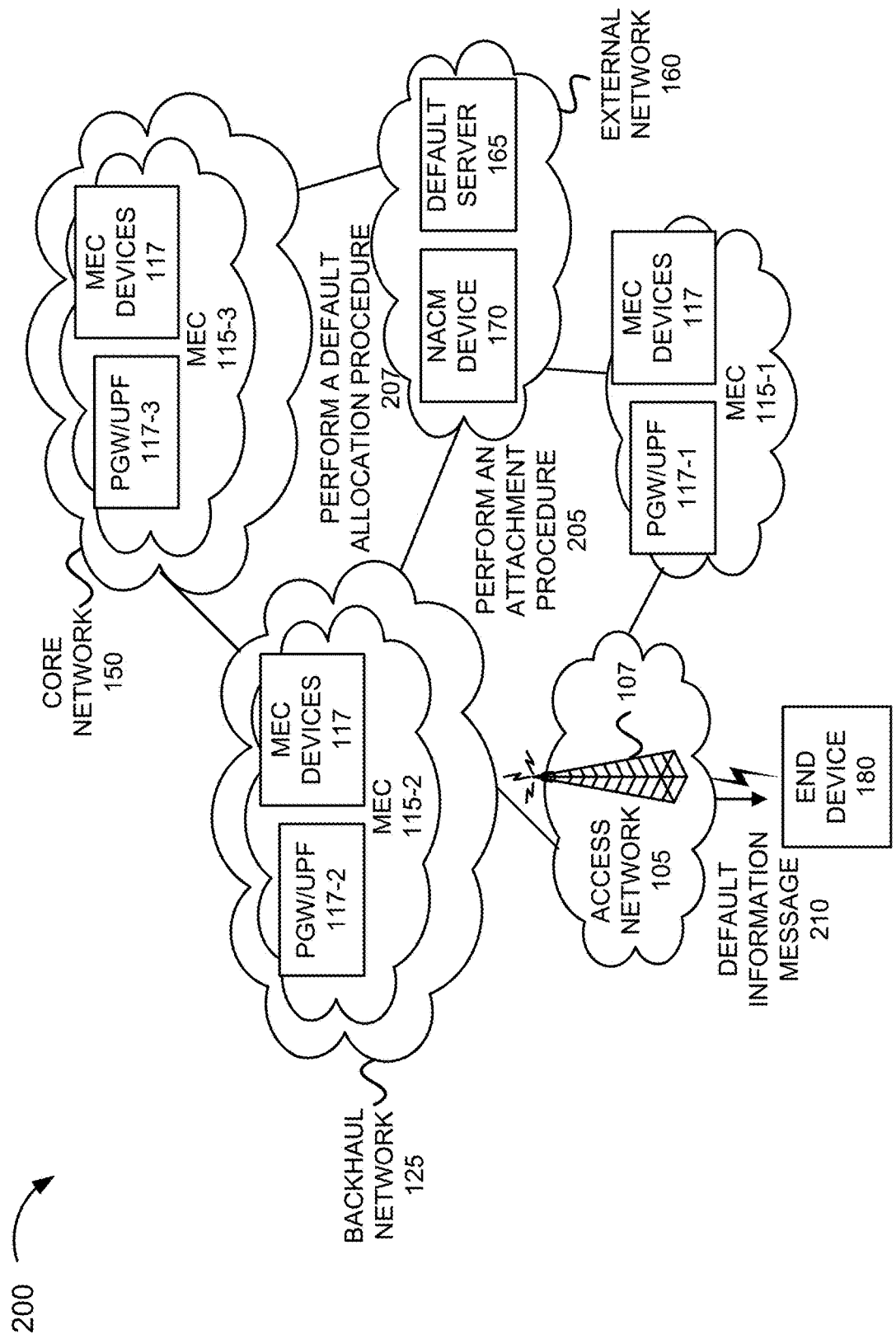
FIGS. 2A-2H are diagrams illustrating exemplary processes of exemplary embodiments of a mobile edge network-based intelligent routing service.

FIGS. 2A-2H are diagrams illustrating an exemplary process of an exemplary embodiment of the mobile edge network-based intelligent routing service. Referring to FIG. 2A, an environment 200, which is consistent with environment 100, is illustrated.

According to an exemplary scenario, assume that end device 180, access network 105, and core network 150 perform an attachment procedure 205. According to an exemplary embodiment, end device 180 may be configured to attach to NACM device 170. According to an exemplary implementation, during the attachment procedure, NACM device 170 may obtain a device service profile of end device 180 from core device 155. For example, in relation to an LTE core network, core device 155 (e.g., an MME or an HSS) may transmit the device service profile to NACM device 170. According to other exemplary implementations, end device 180 may transmit the device service profile to NACM device 170. For example, end device 180 may store the device service profile. According to yet other exemplary implementations, core device 155 or end device 180 may transmit the device service profile to NACM device 170 subsequent to completion of the attachment procedure.

According to various exemplary embodiments, the device service profile may include information indicating attributes of end device 180 and subscription information. For example, the device service profile may indicate a type of end device (e.g., an IoT device, a user device, a category of end device, a class of end device, etc.), whether the end device is a mobile device or a stationary device, and/or other types of information that indicates a characteristic of end device 180. Subscription information may indicate a type, a level, and/or a tier of wireless access/use, control parameters and values relating to quality of service, such as a Maximum Bit Rate (MBR), a Guaranteed Flow Bit Rate (GFBR), a Maximum Flow Bit Rate (MFBR), a Maximum Packet Loss Rate (MPLR), and/or other types of control parameters and values (e.g., packet error rate (PER), Allocation and Retention Priority (ARP), etc.), wireless service access or use restrictions (e.g., data limits, restrictions on time of access, duration of wireless service usage, dual connectivity, access and use of a MEC network, access and use of an application or a service, etc.), application service access or restrictions/usage, and/or other types of information pertaining to a service (e.g., wireless service, an application service, a MEC service, historical information pertaining to previous attachments, application services used, etc.).

As further illustrated in FIG. 2A, NACM device 170 may perform a default allocation procedure 207. For example, NACM device 170 may use the device service profile and network topology/configuration information of external network 160 to select a default server (e.g., default server 165) via which end device 180 may be provided an application service. As illustrated, NACM device 170 may provide a default information message 210 to end device. The default information message may indicate default server(s) 165 of external network 160 that may provide application service(s) for end device 180.

Figure 2B:
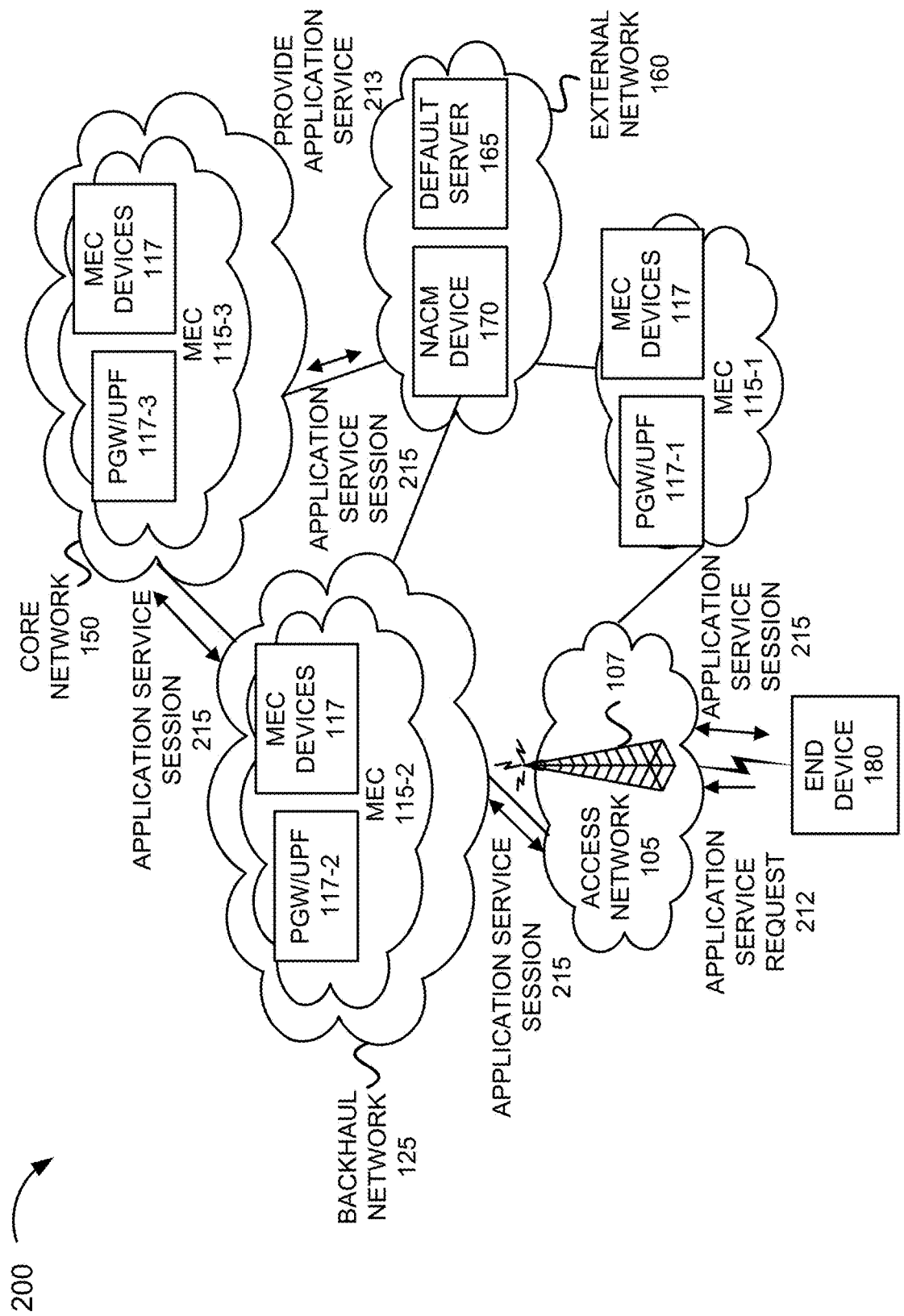

Referring to FIG. 2B, subsequent to receiving the default information message, end device 180 may select a default server to be provided with an application service, and transmit an application service request 212 to the selected default server (e.g., default server 165). In response to receiving the request, default server 165 may provide the application service 213 to end device 180. For example, an application service session 215 may conducted.

Figure 2C:
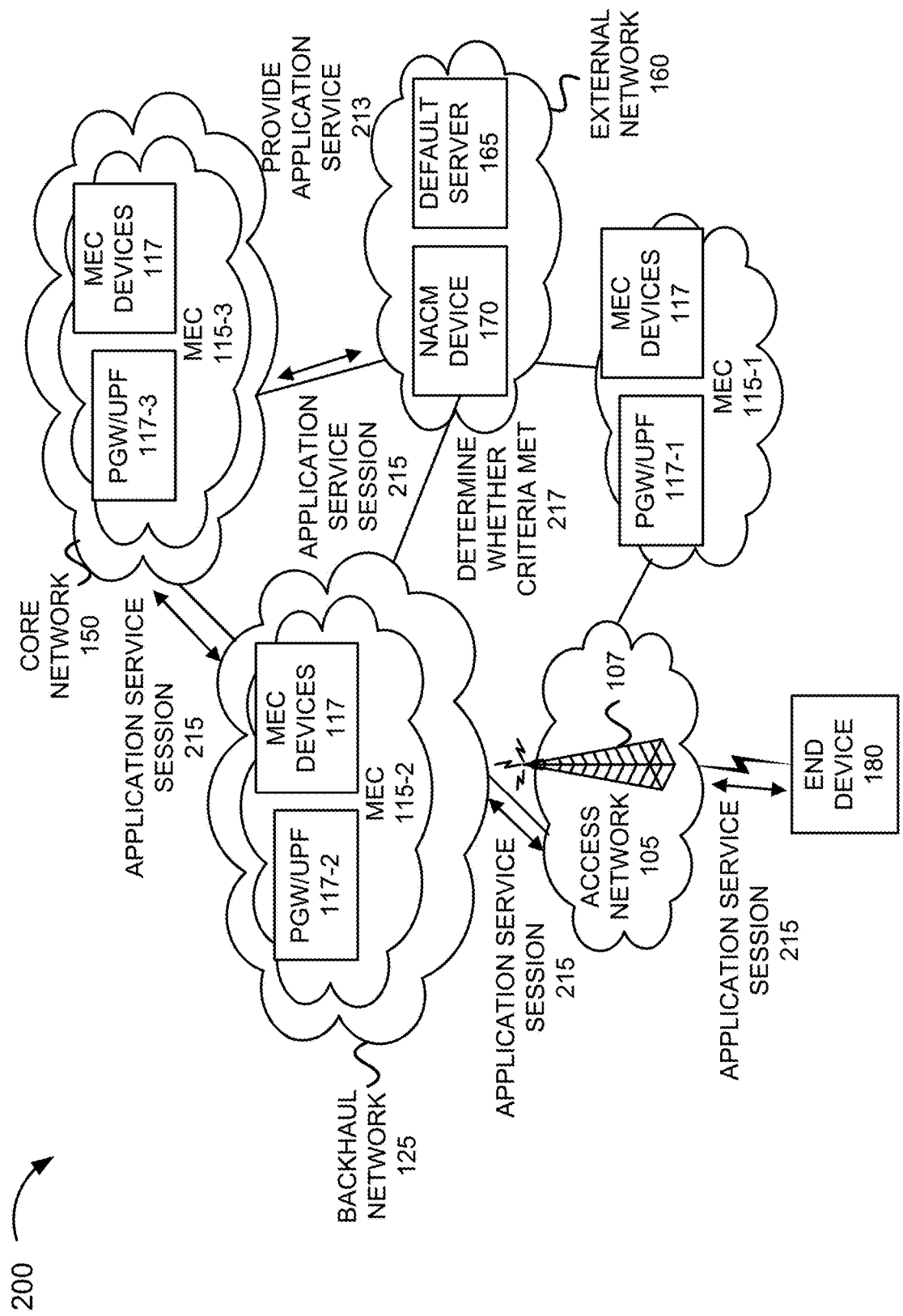

Referring to FIG. 2C, NACM device 170 may determine whether criteria are met 217. For example, NACM device 170 may obtain performance metric information pertaining to the application session from default server 165 and from end device 180. For example, default server 165 and end device 180 may each report the performance metric information representative of what is occurring during the application service session, to NACM device 170. According to an exemplary embodiment, the performance metric information may include one or multiple performance metric parameters and values. For example, the performance metric parameter and value may pertain to latency, control parameters and values included in the subscription information, packet drop rate, error rate, and/or another type of communication metric pertaining to the application service and/or the wireless service.

Depending on the outcome of the analysis of the performance metric information, NACM device 170 may determine whether or not default server 165 should continue to provide the application service to end device 180. For example, when NACM device 170 determines that the criteria are met, NACM device 170 may determine that default server 165 should continue to provide the application service to end device 180. However, when NACM device 170 determines that the criteria are not met, NACM device 170 may determine that default server 165 should not continue to provide the application service to end device 180. According to an exemplary embodiment of the mobile edge network-based intelligent routing service, NACM device 170 may reiterate this step of checking whether the criteria are met during the application session. For example, NACM device 170 may monitor the behavior of the session continuously, periodically, or according to some other type of configured mechanism.

According to this exemplary scenario, assume that NACM device 170 determines that the criteria are not met.

For example, NACM device 170 that latency requirements are not being met. By way of further example, NACM device 170 may store a threshold latency value that is used as a comparative to a latency value included in the performance metric information. The threshold latency value may correlate to the application service (e.g., by category of the application service, by the specific application service, etc.). As a result of the comparison, NACM device 170 may determine that the minimal latency requirement associated with the application service is not satisfied.

Figure 2D:
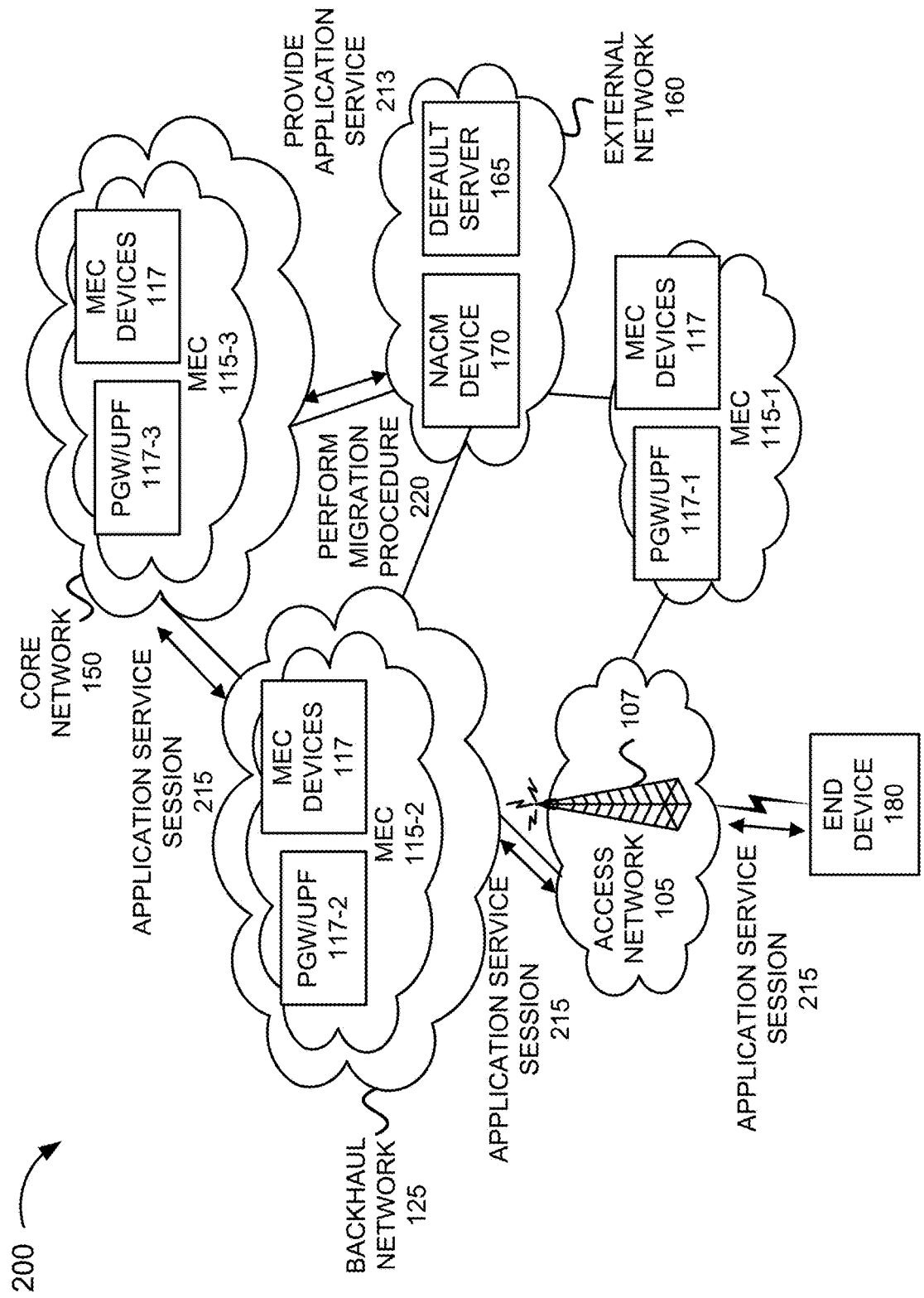

Referring to FIG. 2D, in response to this determination, NACM device 170 may perform a migration procedure 220. For example, NACM device 170 may determine that the application service should be provided by MEC network 115-3. NACM device 170 may access and analyze network topology and configuration information pertaining to MEC network 115-3. Additionally, NACM device 170 may obtain information from MEC network 115-3 regarding the application services MEC network 115-3 can support. According to an exemplary scenario, based on the analysis that the application service may be migrated to MEC network 115-3, NACM device 170 may select an anchor node and a server node in MEC network 115-3. For example, NACM device 170 may select PGW/UPF 117-3 to act as the new anchor node, and select a server node from MEC devices 117 of MEC network 115-3. NACM device 170 may manage network address assignment, content migration, context information, and other types of mechanisms to ensure the successful migration of the application service from external network (e.g., NACM device 170 as the default anchor node and default server 165 as the default server) to MEC network 115-3. According to an exemplary embodiment, NACM device 170 may assign end device 180 with a temporary network address (e.g., a temporary IP address) when end device 180 moves from NACM device 170 to a MEC network 115, and when end device 180 migrates between different MEC networks 115, as described herein. Additionally, when NACM device 170 acts as the default anchor, NACM device 170 may assign a default or global network address (e.g., a default IP address) to end device 180. As described further below, NACM device 170 may store intelligent MEC-based routing information that includes information pertaining to network address assignment, serving anchor nodes, performance metric information, and other context information that may be used to provide the mobile edge network-based intelligent routing service.

Figure 2E:
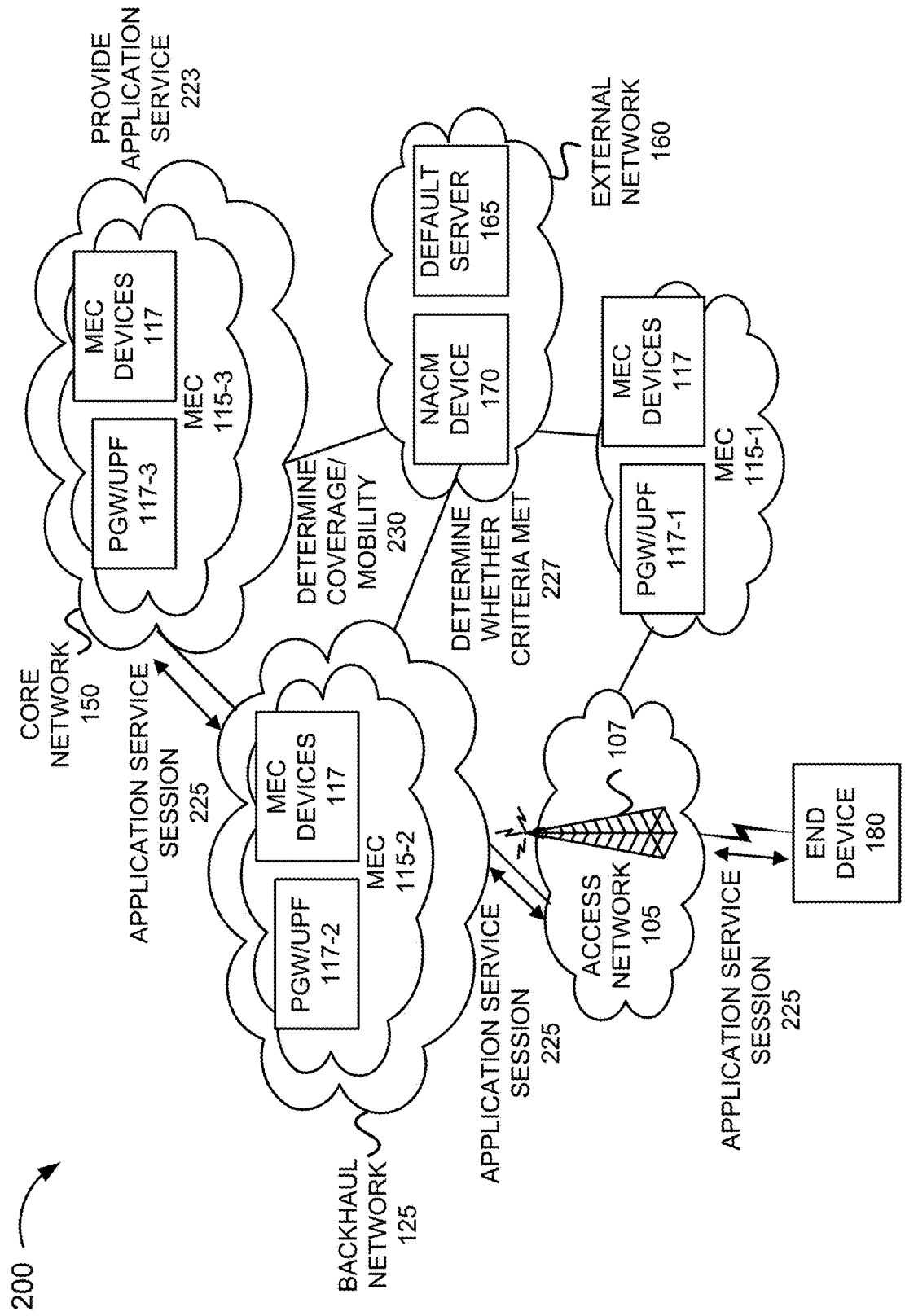

Referring to FIG. 2E, subsequent to the completion of the migration procedure, MEC network 115-3 may provide the application service 223 to end device 180. For example, an application service session 225 may be established. Thereafter, in a manner similar to that previously described, NACM device 170 may determine whether criteria are met 227. For example, NACM device 170 may obtain performance metric information from MEC network 115-3 and end device 180 in relation to the application service session. Depending on the outcome of the analysis of the performance metric information, NACM device 170 may determine whether or not MEC network 115-3 should continue to provide the application service to end device 180. For example, when NACM device 170 determines that the criteria are met, NACM device 170 may determine that PGW/UPF 117-3 and a server of MEC devices 117 should continue to provide the application service to end device 180. However, when NACM device 170 determines that the criteria are not met, NACM device 170 may determine whether end device 180 is within the coverage area of another layer of MEC network 115. For example, NACM device 170 may determine whether end device 180 is in a location that may be served by MEC network 115-2. Additionally, for example, NACM device 170 may analyze the type of end device (e.g., mobile, stationary, etc.) and/or recent/current mobility information (e.g., handovers between access devices 107, etc.) associated with end device 180. NACM device 170 may also analyze network topology and configuration information pertaining to MEC network(s) 115-2, access network(s) 105, and so forth. For purposes of illustration, this analysis is shown as NACM device 170 may determine coverage and/or mobility 230.

Figure 2F:
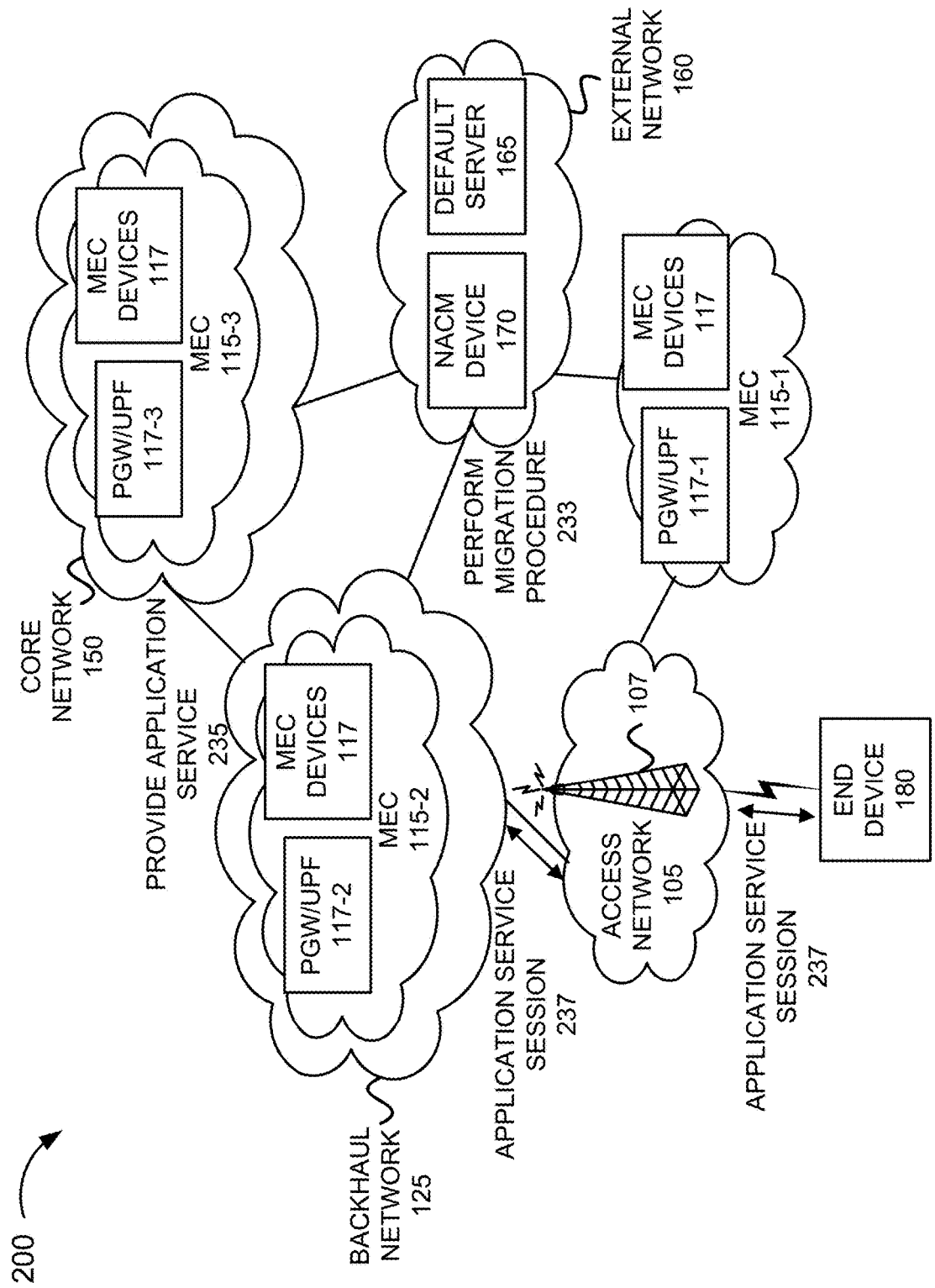

According to this exemplary scenario, assume that NACM device 170 determines that the criteria are not met and that MEC network 115-2 may provide the application service. Referring to FIG. 2F, in response to this determination, NACM device 170 may perform a migration procedure 233 in a manner similar to that previously described except in relation to MEC network 115-2. As further illustrated, PGW/UPF 117-2 and a server of MEC devices 117 of MEC network 115-2 may provide the application service 235. For example, an application service session 237 may be established. NACM device 170 may assign a temporary network address to end device 180 for use in relation to MEC network 115-2. NACM device 170 may also update the intelligent MEC-based routing information, as described herein.

Figure 2G:
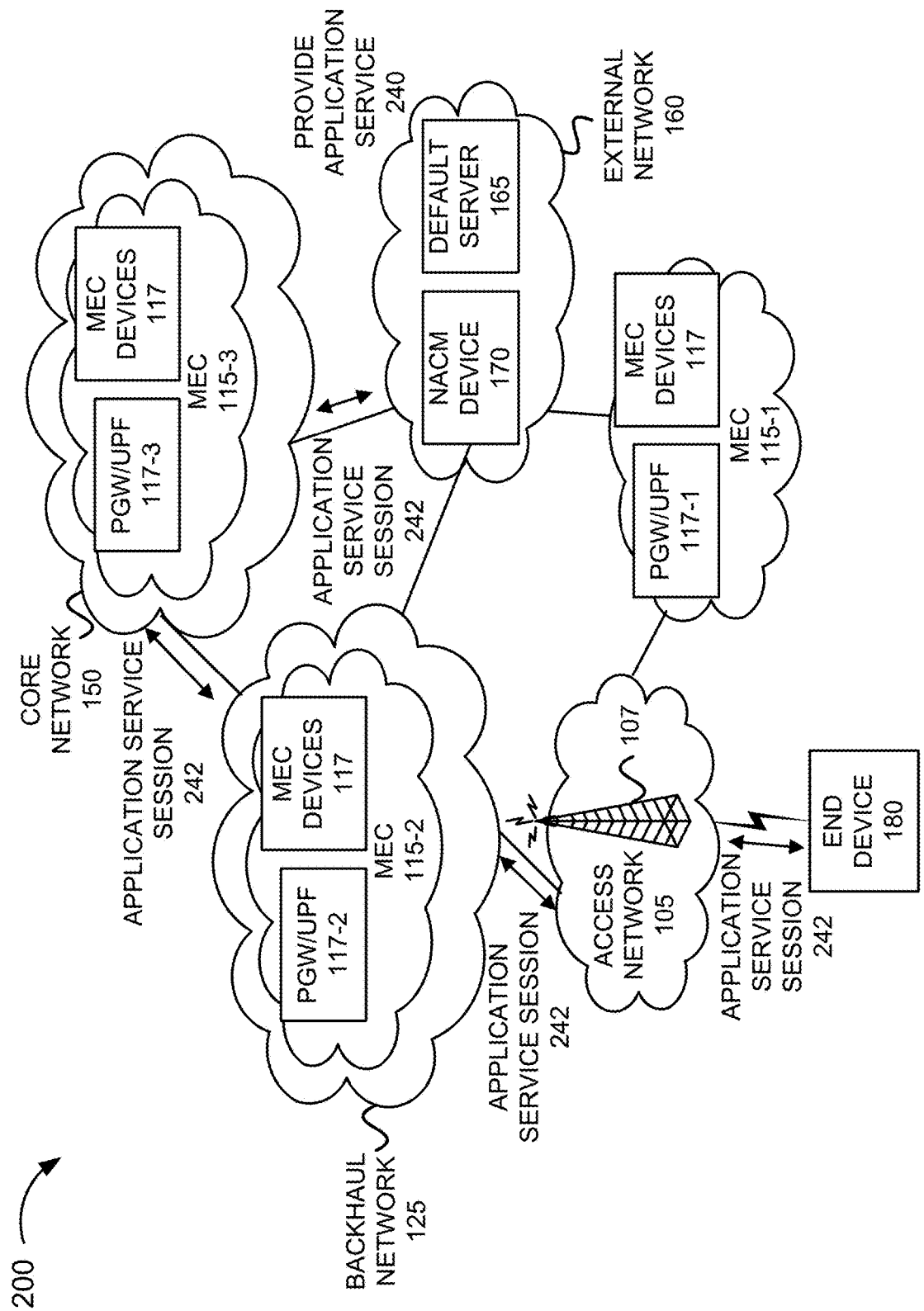

According to another exemplary scenario, as illustrated in FIG. 2G, when NACM device 170 determines that the criteria are not met, but end device 180 is not within a coverage area of MEC network(s) 115-2, NACM device 170 may perform the migration procedure such that end device 180 re-anchors to NACM device 170 (e.g., as the default anchor node) and default server 165 provides the application service 240 to end device 180. For example, an application service session 242 may be established.

Figure 2H:
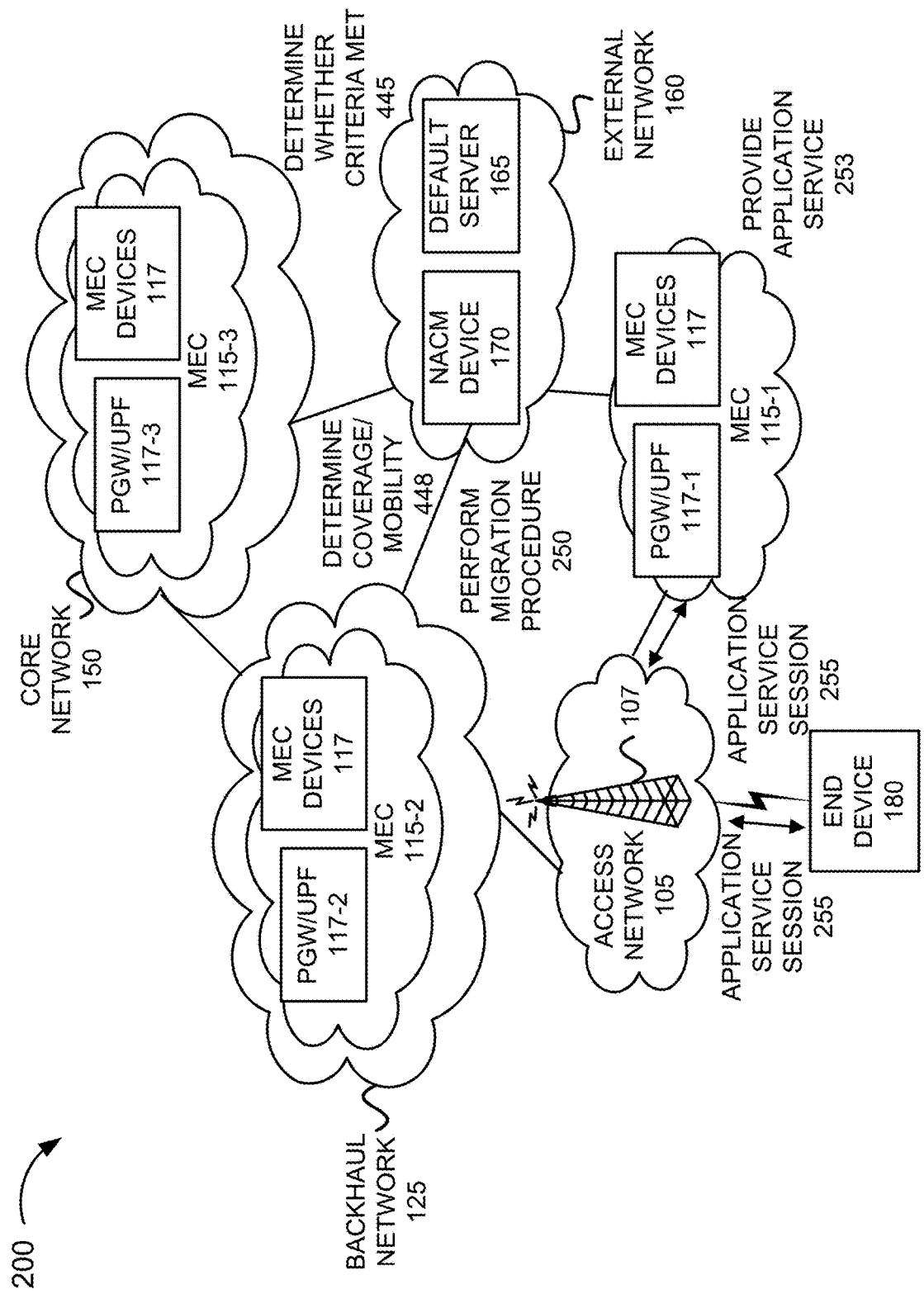

Referring to FIG. 2H, subsequent to the completion of the migration procedure, NACM device 170 may determine whether criteria are met 445. When the criteria are satisfied, MEC network 115-2 may continue to provide the application service to end device 180, or in the alternative, as described above, NACM device 170 and default server 165 may continue to provide the application service. According to other exemplary scenarios, when the criteria are not satisfied, NACM device 170 may determine coverage mobility 448 and/or perform a migration procedure 250. For example, when end device 180 is being serviced by MEC network 115-2, NACM device 170 may determine whether end device 180 is within a coverage area of MEC network(s) 115-1, and if so, NACM device 170 may perform the migration procedure, and MEC network 115-1 may provide the application service 253. For example, an application service session 255 may be established between end device 180 and PGW/UPF 117-1 and a server of MEC devices 117 of MEC network 115-1. Alternatively, when end device 180 is not within the coverage area, NACM device 170 may migrate the application service back to NACM device 170 and default server 165, or migrate the application service to MEC network 115-3, and an application service session may be established. According to yet another exemplary scenario, when the criteria are not met by external network 160, NACM device 170 may perform intelligent routing for provisioning the application service to one of the MEC layers of MEC network 115.

Although FIGS. 2A-2H illustrate exemplary processes of the mobile edge network-based intelligent routing service, according to other exemplary embodiments, the process may include additional, different, and/or fewer steps, and/or include additional, different, and/or fewer messages. The processes illustrated and described in FIGS. 2A-2H are exemplary and according to various exemplary scenarios. According to an exemplary embodiment, the mobile edge network-based intelligent routing service may perform various steps, as described, in relation to each application service requested by or provided to end device 180.

According to an exemplary embodiment, NACM device 170 may store a database or another type of data repository or data structure that stores context information in support of the mobile edge network-based intelligent routing service. According to another exemplary embodiment, although not illustrated, the information may be stored by another network device by which NACM device 170 may access. An exemplary embodiment of intelligent MEC-based routing information is described further below.

FIG. 3 is a diagram illustrating exemplary intelligent MEC-based routing information that may be stored in a table 300. As illustrated, table 300 may include a temporary network address field 305, a global network address field 310, an anchor node field 315, a time-to-live (TTL) field 320, a retry field 325, and a performance metric field 330. As further illustrated, table 300 includes records 301-1 through 301-X (also referred to as records 301, or individually or generally as record 301) that each includes a grouping of fields 305, 310, 315, 320, 325, and 330. Intelligent MEC-based routing information is illustrated in tabular form merely for the sake of description. In this regard, intelligent MEC-based routing information may be implemented in a data structure different from a table. The values illustrated in fields 305-330 of record 301-1 are exemplary.

Temporary network address field 305 may store a temporary network address assigned by NACM device 170 to end device 180. For example, NACM device 170 may assign the temporary network address when end device 180 is moved from the default service nodes to MEC network 115, or from one MEC layer to another MEC layer, as previously described. As an example, the temporary network address may be an IPv4 address. According to another example, the temporary network address may be an IPv6 address. According to yet other examples, the network address may be another type of network address.

Global network address field 310 may store a default or permanent network address assigned by NACM device 170 to end device 180. For example, NACM device 170 may assign the default or permanent network address to end device 180 as a part of the anchoring with NACM device 170. End device 180 may use the default or permanent network address, for example, when obtaining the application service from the default server.

Anchor node field 315 may store an identifier of the anchor node that services end device 180. For example, anchor node field 315 may indicate a PGW/UPF of one of the MEC networks 115 or NACM device 170.

TTL field 320 may store a time-to-live value that relates to a data persistence timer. One or more instances of data may be cleansed from storage based on the TTL value. Additionally, the TTL field 320 may store different values for information relating to different MEC layers. For example, information associated with a far edge MEC layer (e.g., MEC network 115-1), such as the temporary network address and anchor node, may have a shorter TTL value than information associated with an edge MEC layer (e.g., MEC network 115-2).

Retry field 325 may store a value that indicates a number of attempts to locate end device 180 via an anchor node. As described further below, this process may minimize the occurrence of stale sessions when end device 180 moves out of coverage.

Performance metric field 330 may store a performance metric parameter and value of an application service. Additionally, or alternatively, performance metric field 330 may store a performance metric parameter and value pertaining to the MEC layer (e.g., a MEC server of a MEC layer correlated to the anchor node) and end device 180.

According to other exemplary implementations, table 300 may store additional, fewer, and/or different instances of intelligent MEC-based routing information in support of the mobile edge network-based intelligent routing service, as described herein. For example, table 300 may include a field that stores information that identifies end device 180, a field that stores information that indicates a category of the application service or the specific application service, and a field that stores an identifier of the server that is providing the application service.

FIG. 4 is a diagram illustrating exemplary components of a device 400 that may be included in one or more of the devices described herein. For example, device 400 may correspond to components included in NACM device 170, access devices 107 of access network 105, MEC devices 117 of MEC networks 115, network devices 127 of backhaul network 125, core devices 155 of core network 150, network devices 165 of external network 160, and end device 180. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with respect to NACM 170, software 420 may include an application that, when executed by processor 410, provides a function of the mobile edge network-based intelligent routing service, as described herein. Additionally, with reference to MEC devices 117, core devices 155, or another network device, software 420 may include an application that, when executed by processor 410, provides a function of the mobile edge network-based intelligent routing service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
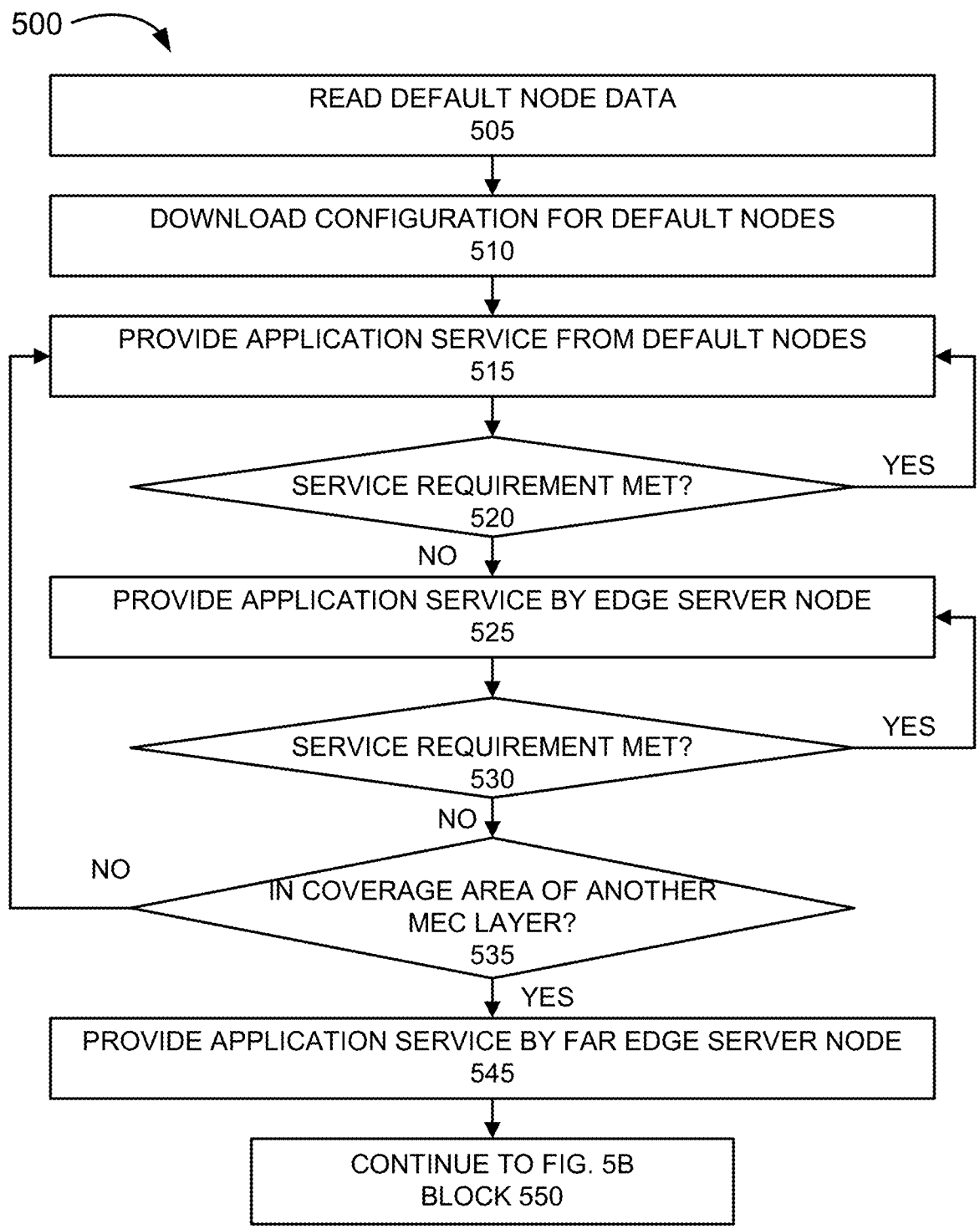
FIGS. 5A and 5B are flow diagrams illustrating an exemplary process of an exemplary embodiment of the mobile edge network-based intelligent routing service.
Figure 5B:
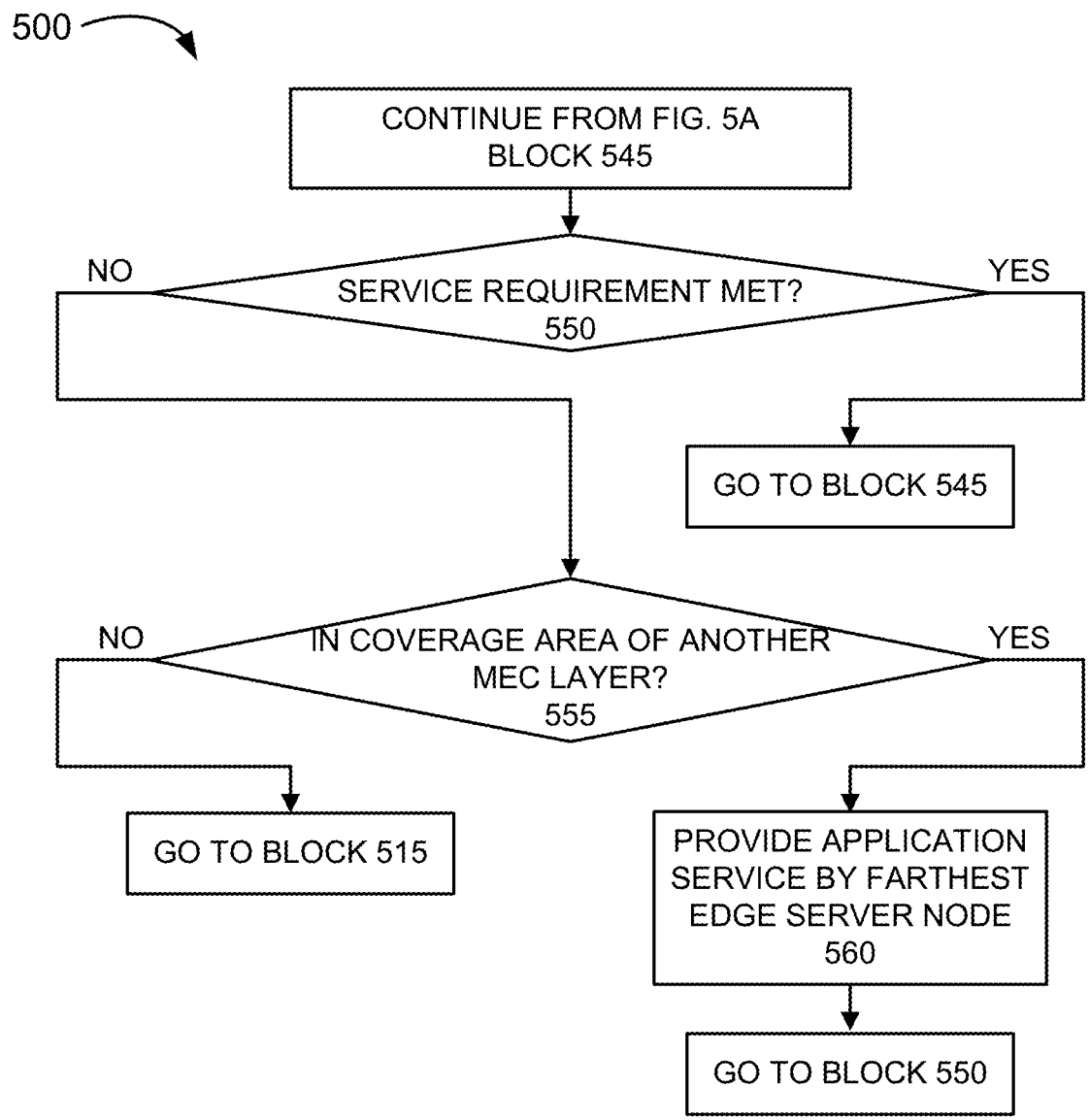

FIGS. 5A and 5B are flow diagrams illustrating an exemplary process 500 of an exemplary embodiment of the mobile edge network-based intelligent routing service. According to an exemplary embodiment, end device 180 performs some steps of process 500. According to an exemplary embodiment, NACM device 170 performs other steps of process 500. For example, processor 410 executes software 420 to perform a step illustrated in FIGS. 5A and 5B, and described herein. Alternatively, a step illustrated in FIGS. 5A and 5B, and described herein, may be performed by execution of only hardware.

Referring to FIG. 5A, in block 505, default node data may be read. For example, end device 180 may read data stored in a memory (e.g., a Subscriber Identity Module (SIM) card or another memory device) that indicates an access point name (APN) or other identifier to which to anchor or connect when attaching to the network. For example, the default node data may indicate NACM device 170.

In block 510, configuration data for default nodes may be downloaded. For example, end device 180 may download or obtain from NACM device 170 data indicating a default server (e.g., default server 165) from which to obtain an application service.

In block 515, an application service may be provided by default nodes. For example, the default server may provide an application service to end device 180 via NACM device 170.

In block 520, it may be determined whether a service requirement is being met. For example, NACM device 170 may determine whether or not criteria are being met in relation to the application service, as previously described.

When it is determined that the service requirement is satisfied (block 520—YES), process 500 may return back to block 515. For example, the default server may continue to provide the application service to end device 180 via NACM device 170. When it is determined that the service requirement is not satisfied (block 520—NO), the application service may be provisioned in one of the MEC layers (block 525). For example, NACM device 170 may perform a migration procedure in which an anchor node (e.g., PGW/UPF) and a server of MEC network 115-3 may be provisioned to provide the application service. The server may provide the application service to end device 180 via the anchor node of MEC network 115-3.

In block 530, it may be determined whether a service requirement is being met. For example, NACM device 170 may determine whether or not criteria are being met in relation to the application service, as previously described.

When it is determined that the service requirement is satisfied (block 530—YES), process 500 may return back to block 525. For example, the server of MEC network 115-3 may continue to provide the application service to end device 180 via the PGW/UPF of MEC network 115-3. When it is determined that the service requirement is not satisfied (block 530—NO), it may be determined whether the end device is within a coverage area of another MEC layer (block 535). For example, NACM device 170 may determine whether end device 180 is in a coverage area that may be serviced by a MEC of a far edge server (e.g., MEC network 115-2).

When it is determined that the end device is not within the coverage area of another MEC layer (block 535—NO), process 500 may return to block 515. For example, NACM device 170 may migrate the application service back to external network 160. The default server may provide the application service to end device 180 via NACM device 170. When it is determined that the end device is within the coverage area of another MEC layer (block 535—YES), the application service may be provided by the other MEC layer (block 545). For example, NACM device 170 may perform a migration procedure in which an anchor node (e.g., PGW/UPF) and a server of MEC network 115-2 may be provisioned to provide the application service. The server may provide the application service to end device 180 via the anchor node of MEC network 115-2.

Referring to FIG. 5B, it may be determined whether a service requirement is being met. For example, NACM device 170 may determine whether or not criteria are being met in relation to the application service, as previously described.

When it is determined that the service requirement is satisfied (block 550—YES), process 500 may return back to block 545. For example, the server of MEC network 115-2 may continue to provide the application service to end device 180 via the PGW/UPF of MEC network 115-2. When it is determined that the service requirement is not satisfied (block 550—NO), it may be determined whether the end device is within a coverage area of another MEC layer (block 555). For example, NACM device 170 may determine whether end device 180 is in a coverage area that may be serviced by a MEC of a farthest edge server (e.g., MEC network 115-1).

When it is determined that the end device is not within the coverage area of another MEC layer (block 555—NO), process 500 may return to block 515. For example, NACM device 170 may migrate the application service back to external network 160. Alternatively, although not illustrated in FIG. 5B, NACM device 170 may migrate the application service to a higher MEC layer (e.g., MEC network 115-3) relative to the current MEC layer (e.g., MEC network 115-2). When it is determined that the end device is within the coverage area of another MEC layer (block 555—YES), the application service may be provided by the other MEC layer (block 560). For example, NACM device 170 may perform a migration procedure in which an anchor node (e.g., PGW/UPF) and a server of MEC network 115-1 may be provisioned to provide the application service. The server may provide the application service to end device 180 via the anchor node of MEC network 115-1. Process 500 may return to block 550. Process 500 may end when the application service session is terminated.

Although FIGS. 5A and 5B illustrate an exemplary process 500 of the mobile edge network-based intelligent routing service, according to other embodiments, process 500 may include additional operations, fewer operations, and/or different operations than those illustrated in FIGS. 5A and 5B, and described herein. For example, NACM device 170 may select one of network devices 165 to act as an anchor node via which the application service is provided. Additionally, depending on the number and/or type of layers of the multi-layered mobile edge computing network, process 500 may yield the selection and migration of the application service to a MEC layer that is different from that described.

Figure 6:
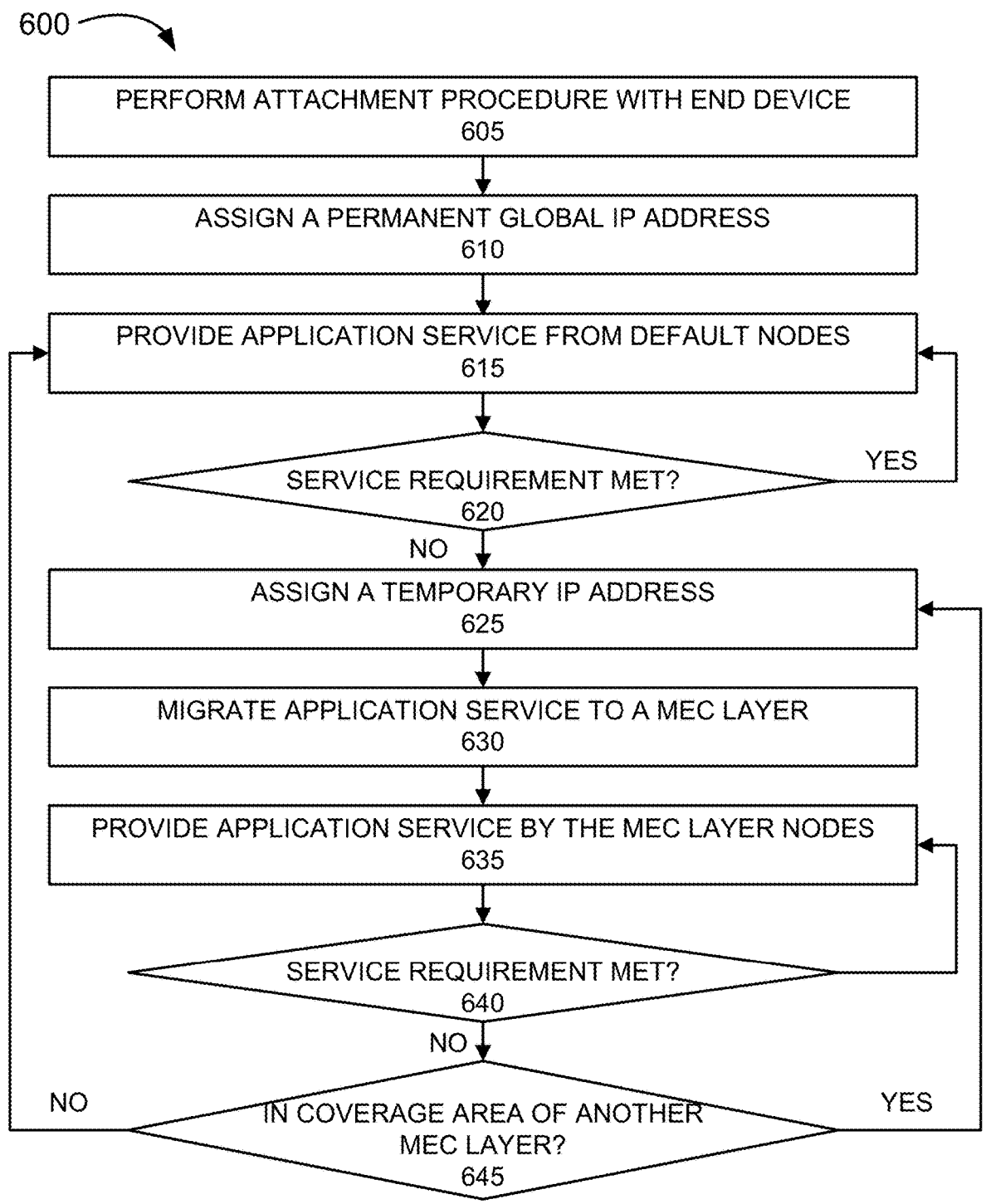
FIG. 6 is a flow diagram illustrating another exemplary process of an exemplary embodiment of the mobile edge network-based intelligent routing service.

FIG. 6 is a flow diagram illustrating another exemplary process 600 of an exemplary embodiment of the mobile edge network-based intelligent routing service. According to an exemplary embodiment, NACM device 170 performs steps of process 600. For example, processor 410 executes software 420 to perform a step illustrated in FIG. 6 and described herein. Additionally, or alternatively, a step illustrated in FIG. 6 may be performed by execution of only hardware.

In block 605, an attachment procedure with end device may be performed. For example, NACM device 170 may connect to end device 180 during an initial attachment procedure performed by end device 180 and the network.

In block 610, a permanent global IP address may be assigned. For example, NACM device 170 may assign a permanent IP address to end device 180. In block 615, the application service may be provided by the default nodes. For example, NACM device 170 and a default server may provide the application service to end device 180.

In block 620, it may be determined whether the service requirement is being met. For example, NACM device 170 may determine whether or not criteria are met, as previously described. When it is determined that the service requirements are being met (block 620—YES), process 600 may return to block 615. For example, the default nodes may continue to provide the application service to end device 180 using the permanent global IP address. When it is determined that the service requirements are not being met (block 620—NO), a temporary IP address may be assigned (block 625). For example, NACM device 170 may assign a temporary IP address to end device 180. In block 630, the application service may be migrated to a MEC layer, and in block 635, the application service may be provided by the MEC layer. For example, NACM device 170 may assign a MEC layer to provide the application service, and an anchor node and a server node of the MEC layer may provide the application service to end device 180.

In block 640, it may be determined whether the service requirement is being met. For example, NACM device 170 may determine whether or not criteria are met, as previously described. For example, NACM device 170 may receive performance metric information from the anchor node of the MEC layer and end device 180. When it is determined that the service requirements are being met (block 640—YES), process 600 may return to block 635. When it is determined that the service requirements are not being met (block 640—NO), it may be determined whether or not the end device is in the coverage area of another MEC layer (block 645). For example, NACM device 170 may receive location and/or mobility information pertaining to end device 180. According to an exemplary implementation, the mobility information may include current or recent handovers (e.g., in access network 105, etc.). When it is determined that the end device is not within a coverage area of another MEC layer (block 645—NO), process 600 may return to block 615. For example, the default nodes may continue to provide the application service to end device 180 using the permanent global IP address. When it is determined that the end device is within a coverage area of another MEC layer (block 645—YES), process 600 may return to block 625. For example, NACM device 170 may assign a temporary IP address to end device 180. End device 180 and the other MEC layer may use the temporary address for communication regarding the application service.

Although FIG. 6 illustrates an exemplary process 600 of the mobile edge network-based intelligent routing service, according to other embodiments, process 600 may include additional operations, fewer operations, and/or different operations than those illustrated in FIG. 6, and described herein. For example, process 600 may include steps for updating various fields stored in the intelligent MEC-based routing information based on the migration of the application service between different MEC layers and default nodes. Additionally, for example, process 600 may include migrating content between MEC layers, and between the default server and a MEC layer.

Figure 7:
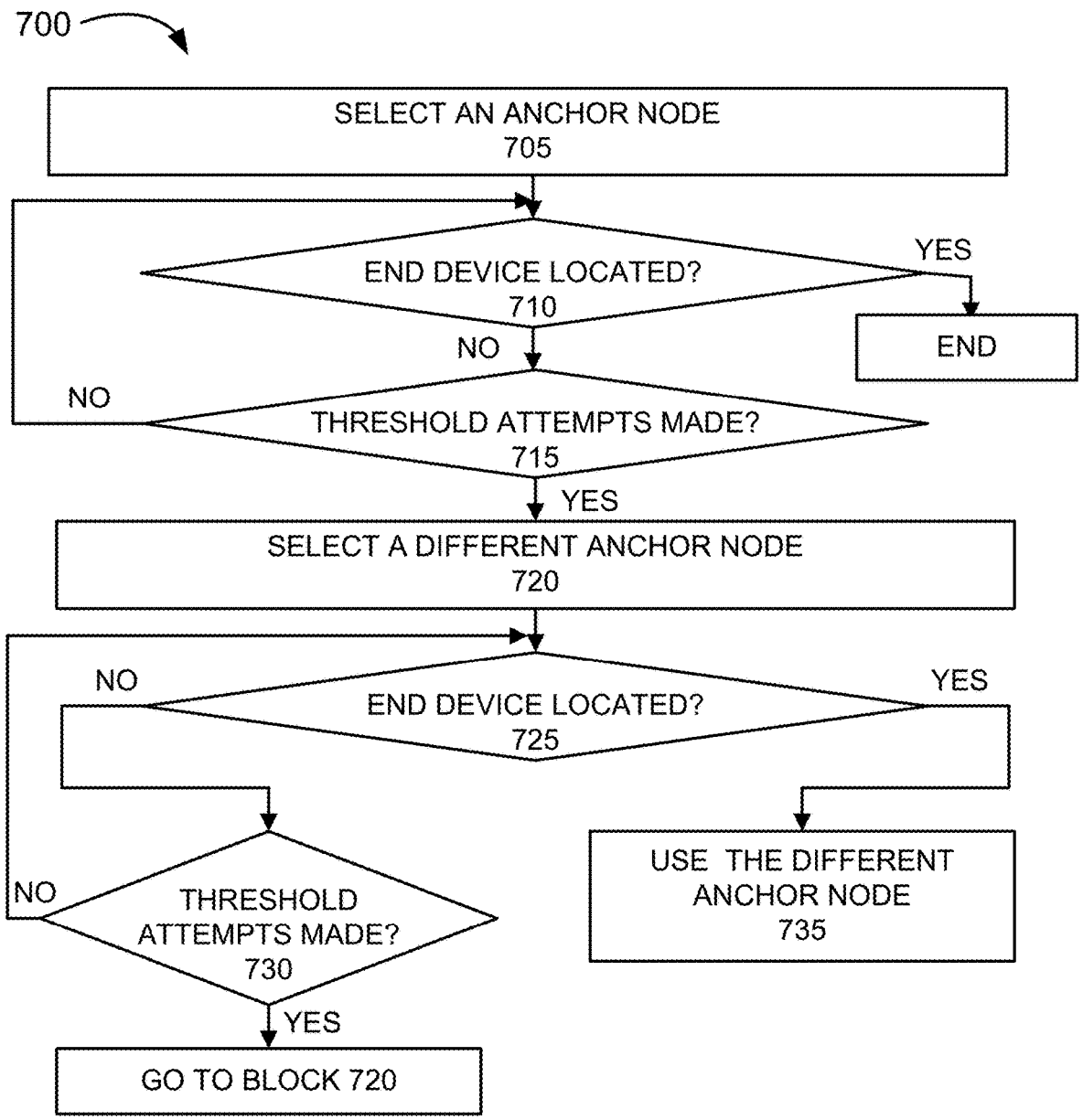
FIG. 7 is a flow diagram illustrating yet another exemplary process of an exemplary embodiment of the mobile edge network-based intelligent routing service.

FIG. 7 is a flow diagram illustrating yet another exemplary process 700 of an exemplary embodiment of the mobile edge network-based intelligent routing service. According to an exemplary embodiment, performs steps of process 700. For example, processor 410 executes software 420 to perform a step illustrated in FIG. 7 and described herein. Additionally, or alternatively, a step illustrated in FIG. 7 may be performed by execution of only hardware.

According to an exemplary embodiment, process 700 may be performed to prevent the occurrence of a stale application session. In block 705, an anchor node may be selected. For example, NACM device 170 may be triggered to page end device 180. In response, NACM device 170 may use the intelligent MEC-based routing information to select the anchor node to which end device 180 is suppose to be anchored. In block 710, it may be determined whether the end device is located. For example, NACM device 170 may determined whether the end device is located or not based on whether or not a paging response to a paging request is received or not. When it is determined that the end device is located (block 710—YES), process 700 may end. For example, the anchor node may serve the network-side communication to end device 180. When it is determined that the end device is not located (block 710—NO), it may be determined whether a threshold number of attempts has been made (block 715). For example, referring back to FIG. 3 and retry field 325, an anchor node may be assigned a threshold number of retries. Referring back to FIG. 7, when the threshold number of attempts has not been made (block 715—NO), process 700 may return back to block 710. For example, NACM device 170 may invoke another paging procedure. When the threshold number of attempts has been made (block 715—YES), a different anchor node may be selected (block 720). For example, NACM device 170 may select another anchor node based on the network topology and configuration information pertaining to environment 100. According to one exemplary implementation, NACM device 170 may select an anchor node that has been previously used by end device 180. According to other exemplary implementations, this may not be the case, and NACM device 170 may randomly select an anchor node based on last known location information or other types of information relating to network presence/activity of end device 180 in relation to the network.

In block 725, it may be determined whether the end device is located. For example, NACM device 170 may determined whether the end device is located or not based on whether or not a paging response to a paging request is received or not. When it is determined that the end device is located (block 725—YES), the different anchor node may be used (block 735). For example, the different anchor node may be used in support of the network-side communication pertaining to the paging. When it is determined that the end device is not located (block 725—NO), it may be determined whether a threshold number of attempts has been made (block 730). When the threshold number of attempts has not been made (block 730—NO), process 700 may return back to block 725. For example, NACM device 170 may invoke another paging procedure. When the threshold number of attempts has been made (block 730—YES), a different anchor node may be selected (block 720).

Although FIG. 7 illustrates an exemplary process 700 of the mobile edge network-based intelligent routing service, according to other embodiments, process 700 may include additional operations, fewer operations, and/or different operations than those illustrated in FIG. 7, and described herein.

Figure 8:
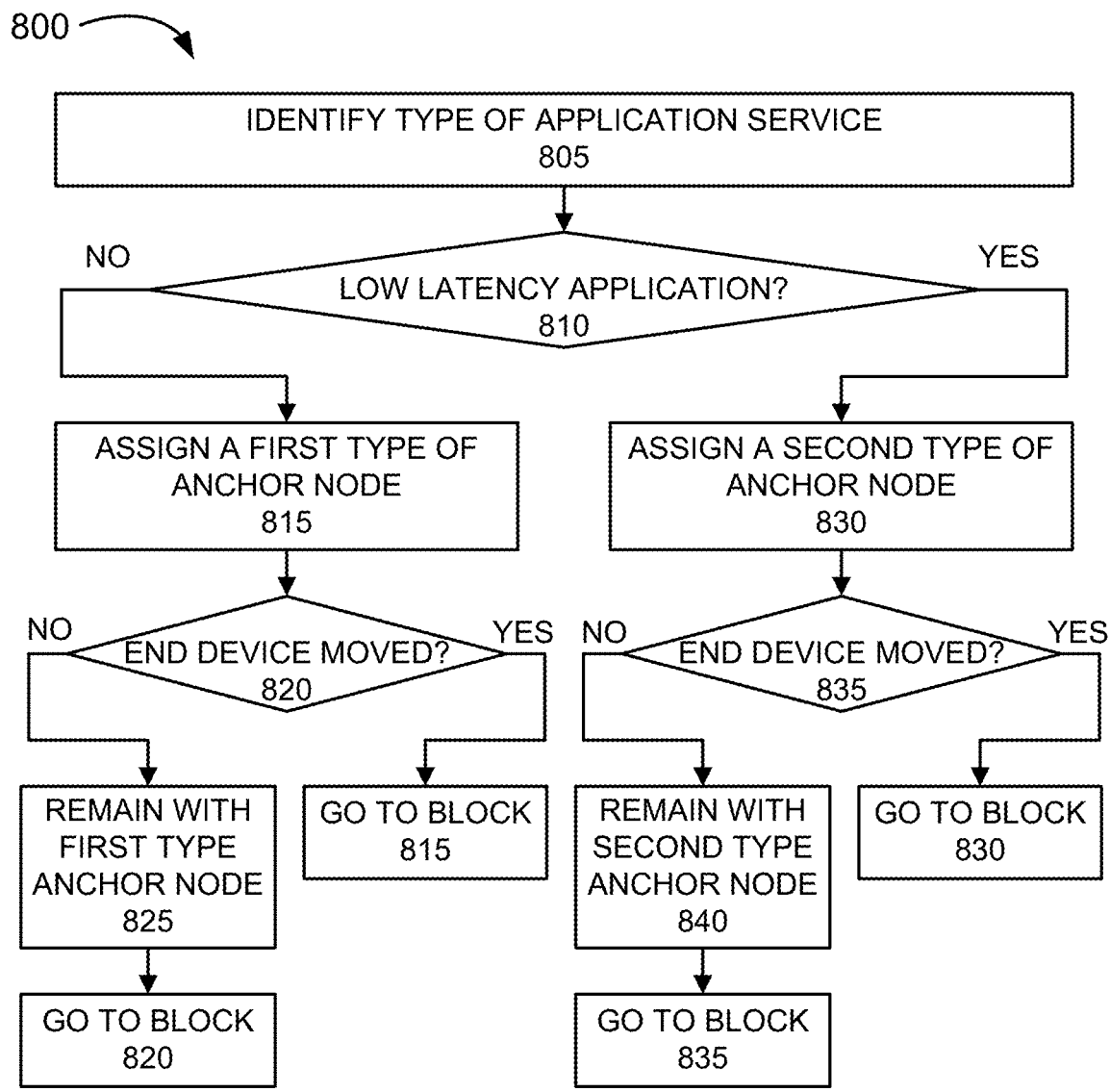
FIG. 8 is a flow diagram illustrating still another exemplary process of an exemplary embodiment of the mobile edge network-based intelligent routing service.

FIG. 8 is a flow diagram illustrating still another exemplary process 800 of an exemplary embodiment of the mobile edge network-based intelligent routing service. According to an exemplary embodiment, performs steps of process 800. For example, processor 410 executes software 420 to perform a step illustrated in FIG. 8 and described herein. Additionally, or alternatively, a step illustrated in FIG. 8 may be performed by execution of only hardware. According to an exemplary embodiment, the mobile edge network-based intelligent routing service may provide for a performance metric-based selection of an anchor node. For purposes of description, process 800 is illustrated and described such that the performance metric is latency. However, according to other exemplary embodiments, the performance metric may be different than latency, or may be a combination of performance metrics that include or omit latency. According to an exemplary embodiment, the performance metric-based selection of an anchor node may pertain to MEC layers. For example, NACM device 170 may perform process 800 as a part of the migration procedure, as described herein.

In block 805, a type of application service may be identified. For example, NACM device 170 may identify the application service that is to be provisioned for end device 180. In block 810, NACM device 170 may determine whether or not the identified application service is a low latency application or not. When it is determined that the application service is not a low latency application (block 810—NO), a first type of anchor node may be selected and assigned (block 815). For example, NACM device 170 may select an anchor node that is not configured to support a low latency application. However, when it is determined that the application service is a low latency application (block 810—YES), a second type of anchor node may be selected and assigned (block 830).

In block 820, it may be determined whether or not end device has moved. For example, NACM device 170 may receive location and/or mobility information pertaining to end device 180, as previously described. Based on this information and network topology information, NACM device 170 may determine whether end device 180 should remain connected to the anchor node or whether another anchor node may need to be used (e.g., end device 180 located or moving to a coverage area not served by the anchor node). When it is determined that the end device has not moved (e.g., outside a coverage area) (block 820—NO), the first type of anchor node may continue to service end device 180 (block 825). Process 800 may return back to block 820. For example, the determination of whether end device 180 remains within a coverage area of the serving anchor node may take place periodically or in response to configurable triggering event.

When is determined that the end device is predicted to move, is moving, or has moved outside the coverage area (block 820—YES), process 800 may return to block 815. For example, NACM device 170 may select another first type anchor node via which the application service may be provided to end device 180. Blocks 835 and 840 may be performed in a manner similar to blocks 820 and 825 except these steps may be performed in relation to the second type of anchor node.

Although FIG. 8 illustrates an exemplary process 800 of the mobile edge network-based intelligent routing service, according to other embodiments, process 800 may include additional operations, fewer operations, and/or different operations than those illustrated in FIG. 8, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to processes illustrated in FIGS. 5A, 5B, and 6-8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
receiving, by a network device of a network, a device service profile pertaining to an end device, wherein the network device includes at least one of a packet gateway (PGW) or a user plane function (UPF) and is a first serving anchor node that provides a default anchor node service to the end device within a first coverage area;
providing, by the network device, application traffic of an application service to the end device via a default network device that hosts the application service, wherein the default network device is selected by the network device based on the device service profile and network topology information for the first coverage area;
determining, by the network device in response to the providing, whether a performance metric pertaining to the application service is satisfied;
selecting, by the network device in response to determining that the performance metric is not satisfied, first network devices, which include a second serving anchor node and a first server that hosts the application service, of a first mobile edge computing network to provide the application service, wherein the first mobile edge computing network is of a first layer of a multi-layered mobile edge computing network;
performing, by the network device in response to the selecting, a first migration procedure of the application service to the first network devices, wherein the first network devices are provisioned to provide the application service to the end device within a second coverage area;
determining, by the network device subsequent to the performing, that the performance metric is not satisfied relative to the first network devices; and
performing, according to the default anchor node service, a second migration procedure of the application service to the default network device and the network device to which the end device re-anchors.

2. The method of claim 1, wherein the multi-layered mobile edge computing network comprises multiple mobile edge computing networks, wherein each mobile edge computing network belongs to one of the multiple layers, and wherein the multiple layers of the multi-layered mobile edge computing network are based on at least one of different latencies or different routing from a network edge.

3. The method of claim 1, further comprising:
determining, by the network device subsequent to the second migration procedure, whether the end device is in a third coverage area that can be serviced by second network devices of a second mobile edge computing network of a second layer that is different from the first layer of the first network devices of the first mobile edge computing network; and
performing, by the network device when the end device is in the third coverage area that can be serviced by the second network devices, a third migration procedure of the application service to the second network devices, wherein the second network devices, which include a second server that hosts the application service, are provisioned to provide the application service to the end device within the third coverage area.

4. The method of claim 1, further comprising:
performing the second migration procedure of the application service to the network device and the default network device irrespective of whether the performance metric is satisfied relative to the network device and the default network device.

5. The method of claim 3, further comprising:
determining, by the network device, whether the performance metric is not satisfied relative to at least the second network devices or the end device;
determining, by the network device in response to determining that the performance metric is not satisfied relative to the at least one of the second network devices or the end device, whether the end device is in a fourth coverage area that can be serviced by third network devices of a third mobile edge computing network of a third layer that is different from the second layer and the first layer; and
performing, by the network device when the end device is in the fourth coverage area that can be serviced by the third network devices, a fourth migration procedure of the application service to the third network devices, wherein the third network devices, which include a third server that hosts the application service, are provisioned to provide the application service to the end device within the fourth coverage area.

6. The method of claim 1, wherein the monitoring method comprises:
receiving, by the network device, performance metric information from the end device and at least one of the first network devices;
analyzing, by the network device, the performance metric information; and
determining, by the network device in response to the analyzing, that the performance metric is not satisfied.

7. The method of claim 1, further comprising:
assigning, by the network device, a permanent network address to the end device, wherein the end device uses the permanent network address to receive the application service from the network device and the default network device; and
assigning, by the network device, a temporary network address to the end device, wherein the end device uses the temporary network address to receive the application service from the first network devices.

8. The method of claim 1, wherein the performance metric further pertains to subscription information associated with the end device.

9. A network device of a network comprising:
a communication interface;
a memory, wherein the memory stores instructions; and
a processor, wherein the processor executes the instructions to:
receive, via the communication interface, a device service profile pertaining to an end device, wherein the network device includes at least one of a packet gateway (PGW) or a user plane function (UPF) and is a first serving anchor node that provides a default anchor node service to the end device within a first coverage area;
provide application traffic of an application service to the end device via a default network device that hosts the application service, wherein and via the default network device is selected by the network device based on the device service profile and network topology information for the first coverage area;
determine, in response to the providing, whether a performance metric pertaining to the application service is satisfied;
select, in response to a determination that the performance metric is not satisfied, first network devices, which include a second serving anchor node and a first server that hosts the application service, of a first mobile edge computing network to provide the application service, wherein the first mobile edge computing network is of a first layer of a multi-layered mobile edge computing network;
perform, in response to the selection, a first migration procedure of the application service to the first network devices, wherein the first network devices are provisioned to provide the application service to the end device within a second coverage area;
determine, subsequent to the performing, that the performance metric is not satisfied relative to the first network devices; and
perform, according to the default anchor node service, a second migration procedure of the application service to the default network device and the network device to which the end device re-anchors.

10. The network device of claim 9, wherein the multi-layered mobile edge computing network comprises multiple mobile edge computing networks, wherein each mobile edge computing network belongs to one of the multiple layers, and wherein the multiple layers of the multi-layered mobile edge computing network are based on at least one of different latencies or different routing from a network edge.

11. The network device of claim 9, wherein the processor further executes the instructions to:
determine, subsequent to the second migration procedure, whether the end device is in a third coverage area that can be serviced by second network devices of a second mobile edge computing network of a second layer that is different from the first layer of the first network devices of the first mobile edge computing network; and
perform, when the end device is in the third coverage area that can be serviced by the second network devices, a third migration procedure of the application service to the second network devices, wherein the second network devices, which include a second server that hosts the application service, are provisioned to provide the application service to the end device within the third coverage area.

12. The network device of claim 9, wherein the processor further executes the instructions to:
perform the second migration procedure of the application service to the network device and the default network device irrespective of whether the performance metric is satisfied relative to the network device and the default network device.

13. The network device of claim 11, wherein the processor further executes the instructions to:
determine whether the performance metric is not satisfied relative to at least the second network devices or the end device;
determine, in response to determining that the performance metric is not satisfied relative to the at least one of the second network devices or the end device, whether the end device is in a fourth coverage area that can be serviced by third network devices of a third mobile edge computing network of a third layer that is different from the second layer and the first layer; and
performing, by the network device when the end device is in the fourth coverage area that can be serviced by the third network devices, a fourth migration procedure of the application service to the third network devices, wherein the third network devices, which include a third server that hosts the application service, are provisioned to provide the application service to the end device within the fourth coverage area.

14. The network device of claim 9, wherein the processor further executes the instructions to:
receive, via the communication interface, performance metric information from the end device and at least one of the first network devices;
analyze, in response to the receipt of the performance metric information, the performance metric information; and
determine, in response to the analysis, that the performance metric is not satisfied.

15. The network device of claim 9, wherein the processor further executes the instructions to:
assign a permanent network address to the end device, wherein the end device uses the permanent network address to receive the application service from the network device and the default network device; and assign a temporary network address to the end device, wherein the end device uses the temporary network address to receive the application service from the first network devices.

16. The network device of claim 9, wherein the performance metric further pertains to subscription information associated with the end device.

17. A non-transitory computer-readable storage medium storing instructions executable by a processor of a network device of a network, which when executed cause the network device to:
receive a device service profile pertaining to an end device, wherein the network device includes at least one of a packet gateway (PGW) or a user plane function (UPF) and is a first serving anchor node that provides a default anchor node service to the end device within a first coverage area;
provide application traffic of an application service to the end device via a default network device that hosts the application service, wherein the default network device is selected by the network device based on the device service profile and network topology information for the first coverage area;
determine, in response to the providing, whether a performance metric pertaining to the application service is satisfied;
select, in response to a determination that the performance metric is not satisfied, first network devices, which include a second serving anchor node and a first server that hosts the application service, of a first mobile edge computing network to provide the application service, wherein the first mobile edge computing network is of a first layer of a multi-layered mobile edge computing network;
perform, in response to the selection, a first migration procedure of the application service to the first network devices, wherein the first network devices are provisioned to provide the application service to the end device within a second coverage area;
determine, subsequent to the performing, whether the performance metric is not satisfied relative to the first network devices; and
perform, according to the default anchor node service, a second migration procedure of the application service to the default network device and the network device to which the end device re-anchors.

18. The non-transitory computer-readable storage medium of claim 17, wherein the multi-layered mobile edge computing network comprises multiple mobile edge computing networks, wherein each mobile edge computing network belongs to one of the multiple layers, and wherein the multiple layers of the multi-layered mobile edge computing network are based on at least one of different latencies or different routing from a network edge.

19. The non-transitory computer-readable storage medium of claim 17, wherein the instructions further comprises instructions, which when executed cause the network device to:
determine, subsequent to the second migration procedure, whether the end device is in a third coverage area that can be serviced by second network devices of a second mobile edge computing network of a second layer that is different from the first layer of the first network devices of the first mobile edge computing network; and
perform, when the end device is in the third coverage area that can be serviced by the second network devices, a third migration procedure of the application service to the second network devices, wherein the second network devices, which include a second server that hosts the application service, are provisioned to provide the application service to the end device within the third coverage area.

20. The non-transitory computer-readable storage medium of claim 17, wherein the instructions further comprise instructions, which when executed cause the network device to:
assign a permanent network address to the end device, wherein the end device uses the permanent network address to receive the application service from the network device and the default network device; and
assign a temporary network address to the end device, wherein the end device uses the temporary network address to receive the application service from the first network devices.

* * * * *